(12) United States Patent
Brockway et al.

(10) Patent No.: US 7,203,905 B2
(45) Date of Patent: Apr. 10, 2007

(54) SYSTEM AND METHOD FOR PLATFORM INDEPENDENT DESKTOP LOCKDOWN

(75) Inventors: Brandon Brockway, Austin, TX (US); Michael Richard Cooper, Austin, TX (US); Jason Robert Kersten, Taylor, TX (US); Kumar Ravi, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 10/322,094

(22) Filed: Dec. 17, 2002

(65) Prior Publication Data
US 2004/0113940 A1 Jun. 17, 2004

(51) Int. Cl.
*G06F 3/00* (2006.01)
(52) U.S. Cl. ..................................... 715/741
(58) Field of Classification Search ............... 717/176; 709/223; 719/319
See application file for complete search history.

(56) References Cited

U.S. PATENT DOCUMENTS

| | | | | |
|---|---|---|---|---|
| 4,102,822 | A * | 7/1978 | Mulaskey | 502/322 |
| 4,845,644 | A | 7/1989 | Anthias et al. | 364/521 |
| 5,243,697 | A | 9/1993 | Hoeber et al. | 395/156 |
| 5,287,502 | A | 2/1994 | Kaneko | 395/600 |
| 5,347,626 | A | 9/1994 | Hoeber et al. | 395/156 |
| 5,386,564 | A | 1/1995 | Shearer et al. | 395/650 |
| 5,425,140 | A | 6/1995 | Bloomfield et al. | 395/156 |
| 5,448,729 | A | 9/1995 | Murdock | 395/600 |
| 5,564,002 | A | 10/1996 | Brown | 395/155 |
| 5,706,456 | A | 1/1998 | Dupper et al. | 395/349 |
| 5,765,153 | A | 6/1998 | Benantar et al. | 707/9 |
| 5,845,090 | A | 12/1998 | Collins, III et al. | 395/200 |
| 5,859,969 | A | 1/1999 | Oki et al. | 395/200.3 |

(Continued)

FOREIGN PATENT DOCUMENTS

EP   1 050 813 A2   11/2000

(Continued)

OTHER PUBLICATIONS

TriTeal Corporation, SoftNC Java Desktop Environment form TriTeal, 1998, http://web.archive.org/web/19980419075356/softnc.triteal.com/softnc/summary.html.*

(Continued)

*Primary Examiner*—Meng-Al T. An
*Assistant Examiner*—Insun Kang
(74) *Attorney, Agent, or Firm*—Van Leeuwen & Van Leeuwen; Mark S. Walker

(57) ABSTRACT

A system and method that provides a platform-neutral shell application for a user interface is provided. The platform neutral shell application is performed in a way that prevents the user from accessing the underlying operating system. The desktop shell application executes in a middleware application. The operating system residing on the client computer system is booted. The middleware application is loaded on the operating system platform. The middleware application is programmed for the particular operating system being used by the client. The shell application is loaded on the middleware application. The shell application prevents the user from accessing the underlying operating system by maximizing the window in which the shell application is running, pinning the shell application window to the foreground, and removing controls from the desktop window would otherwise allow the user to bypass the desktop shell.

18 Claims, 38 Drawing Sheets

U.S. PATENT DOCUMENTS

| | | | |
|---|---|---|---|
| 5,867,163 A | 2/1999 | Kurtenbach | 345/354 |
| 5,874,952 A | 2/1999 | Morgan | 345/328 |
| 5,926,631 A * | 7/1999 | McGarvey | 395/300 |
| 6,044,465 A | 3/2000 | Dutcher et al. | 713/200 |
| 6,061,795 A | 5/2000 | Dircks et al. | 713/201 |
| 6,105,063 A | 8/2000 | Hayes, Jr. | 709/223 |
| 6,105,066 A | 8/2000 | Hayes, Jr. | 709/226 |
| 6,108,332 A | 8/2000 | Kasiviswanathan | 370/360 |
| 6,108,712 A | 8/2000 | Hayes, Jr. | 709/246 |
| 6,123,737 A | 9/2000 | Sadowsky | 717/11 |
| 6,138,153 A | 10/2000 | Collins, III et al. | 709/221 |
| 6,205,476 B1 | 3/2001 | Hayes, Jr. | 709/220 |
| 6,208,342 B1 | 3/2001 | Mugura et al. | 345/339 |
| 6,212,564 B1 | 4/2001 | Harter et al. | 709/228 |
| 6,237,092 B1 | 5/2001 | Hayes, Jr. | 713/100 |
| 6,249,883 B1 | 6/2001 | Cassidy et al. | 714/42 |
| 6,282,568 B1 * | 8/2001 | Sondur et al. | 709/223 |
| 6,282,711 B1 | 8/2001 | Halpern et al. | 717/11 |
| 6,286,041 B1 | 9/2001 | Collins, III et al. | 709/221 |
| 6,310,603 B1 | 10/2001 | Nason et al. | 345/145 |
| 6,330,010 B1 | 12/2001 | Nason et al. | 345/802 |
| 6,337,717 B1 | 1/2002 | Nason et al. | 348/567 |
| 6,339,826 B2 | 1/2002 | Hayes, Jr. et al. | 713/166 |
| 6,344,859 B1 | 2/2002 | Alimpich et al. | 345/762 |
| 6,389,589 B1 | 5/2002 | Mishra et al. | 717/170 |
| 6,417,869 B1 | 7/2002 | Do | 345/718 |
| 6,426,762 B1 | 7/2002 | Nason et al. | 345/788 |
| 6,446,071 B1 | 9/2002 | Callaway et al. | 707/10 |
| 6,476,833 B1 | 11/2002 | Moshfeghi | 715/854 |
| 6,636,250 B1 | 10/2003 | Gasser | 715/853 |
| 6,829,732 B2 | 12/2004 | Whiteside et al. | 714/38 |
| 6,901,403 B1 | 5/2005 | Bata et al. | 707/101 |
| 6,918,056 B2 | 7/2005 | Paek | 714/27 |
| 6,947,943 B2 | 9/2005 | DeAnna et al. | 707/100 |
| 2001/0011341 A1 | 8/2001 | Hayes, Jr. et al. | 712/11 |
| 2002/0112090 A1* | 8/2002 | Bennett et al. | 345/781 |
| 2002/0178271 A1 | 11/2002 | Graham et al. | 709/229 |
| 2003/0035006 A1 | 2/2003 | Kodosky et al. | 345/763 |
| 2003/0149557 A1 | 8/2003 | Cox et al. | 704/2 |
| 2003/0160815 A1 | 8/2003 | Muschetto | 345/733 |
| 2003/0182656 A1 | 9/2003 | Leathers et al. | 717/177 |
| 2004/0024610 A1 | 2/2004 | Fradkov et al. | 705/1 |
| 2005/0156939 A1 | 7/2005 | Fernandez et al. | 345/581 |

FOREIGN PATENT DOCUMENTS

| | | |
|---|---|---|
| EP | 1077411 A1 | 2/2001 |
| EP | 1 227 400 A2 | 7/2002 |
| US | 0 583 207 A1 | 2/1994 |
| WO | WO 99/57863 | 11/1999 |

OTHER PUBLICATIONS

Hayes et al. (WO 99/57863, published Nov. 11, 1999).*
Motifdeveloper.com, "How dow I disable the Minimize . . . window,?" pp. 1-4, Dec. 2000.*
Fitzpatrick et al., "Dynamic Icon Presentation," IBM TDB, vol. 35, No. 4B, Sep. 1992 (p. 227-232).
"Invisible Logical Desktop Views," IBM Research Disclosure, No. 34947, May 1993.
Fitzpatrick et al., "Method for Automatic Presentation Shift Change," IBM TDB, vol. 35, No. 6, Nov. 1992 (p. 326-327).
"JAR File Specification," 1999, Sun Microsystems, Inc., pp. 1-13.

* cited by examiner

1100

| Branch Client Controller | Administration |

New Site

Site ID: [ ] — 1150
Parent Site: [BranchA ▼] — 1105

Policies: — 1110

| Name 1115 | Value 1120 | Inheritance 1125 ||
| --- | --- | --- | --- |
| | | Value 1130 | Ancestor 1135 |
| newbDC | [ Inherited ] ▼ | allow | root |

Desktops: — 1140

| Role 1155 | Desktop 1160 | Inheritance 1170 ||
| --- | --- | --- | --- |
| | | Desktop 1175 | Ancestor 1180 |
| bda-administrator | [ Inherited ] ▼ | bda-administrator | BranchA |
| branch-manager | [ Inherited ] ▼ | branch-manager | BranchA |
| guest | [ Inherited ] ▼ | guest | root |
| loan-officer | [ Inherited ] ▼ | loan-officer | BranchA |
| teller | [ Inherited ] ▼ | teller | root |

[Create Site 1190]  [Reset Values 1195]

Figure 11

Branch Client Controller — Administration

Policies: — 1210  Parent Site: root — 1205

| Name 1212 | Value 1214 | Inheritance 1216 | |
|---|---|---|---|
| | | Value 1218 | Ancestor 1220 |
| newbDC | [ Inherited ] | allow | root |

Desktops: — 1225

| Role 1230 | Desktop 1235 | Inheritance 1240 | |
|---|---|---|---|
| | | Desktop 1242 | Ancestor 1244 |
| bda-administrator | bda-administrator | bda-administrator | BranchA |
| branch-manager | branch-manager | branch-manager | BranchA |
| guest | [ Inherited ] | guest | root |
| loan-officer | loan-officer | loan-officer | BranchA |
| teller | [ Inherited ] | teller | root |

[Submit Changes 1245]  [Reset Values 1250]  [Delete Site 1255]

Publishing:  [Publish 1260]  [Publish with Children 1265]

Child Sites: — 1270

| Name 1272 | Policies 1278 |
|---|---|
| < New Site > | |
| BranchB | |

1275

Machines: — 1280

| ID 1282 | Hostname 1284 | Types 1286 | Roles 1288 | IP Address 1290 | Description 1292 |
|---|---|---|---|---|---|
| < New Machine > | | | | | |
| MACADDR00002 | bds1 | bDS | | 192.168.0.2 | Desktop Server Machine (BDS) |
| MACADDR00004 | bdc1 | bDC | loan-officer | 192.168.0.4 | Loan Officer Machine |
| MACADDR00005 | bdc2 | bDC | teller | 192.168.0.5 | Teller Machine |
| MACADDR00006 | bdc3 | bDC | teller loan-officer branch-manager guest | 192.168.0.6 | Branch Manager Workstation (BDC) |

Branch Client Controller | Administration

New User

User ID: ▭ — 1305
Full Name: ▭ — 1310
Description: ▭ — 1315

Password (Required): — 1320
New | ▭
Confirm | ▭ — 1325

Locale: en_US ▼ — 1330

1332 — Roles:

| Default 1335 | Select 1340 | Name 1345 |
|---|---|---|
| ○ | ☐ | bda-administrator |
| ○ | ☐ | branch-manager |
| ○ | ☐ | guest |
| ○ | ☐ | loan-officer |
| ○ | ☐ | teller |
| | | < New Role > |

— 1350

[Create User 1355] [Reset Values 1360]

*Figure 13*

| Branch Client Controller | | | | Administration | | |
|---|---|---|---|---|---|---|
| Machines | | | | | | |
| ID 1610 | Site 1620 | Hostname 1630 | Types 1640 | Roles 1650 | IP Address 1660 | Description 1670 |
| MACADDR00001 | root | bda | bdA bdS | | 192.168.0.1 | Administration Machine (BDA) |
| MACADDR00002 | BranchA | bds1 | bdS | | 192.168.0.2 | Desktop Server Machine (BDS) |
| MACADDR00003 | BranchB | bds2 | bdS bdC | teller loan-officer branch-manager guest | 192.168.0.3 | Desktop Server Machine (BDS) |
| MACADDR00004 | BranchA | bdc1 | bdC | loan-officer | 192.168.0.4 | Loan Officer Machine |
| MACADDR00005 | BranchA | bdc2 | bdC | teller | 192.168.0.5 | Teller Machine |
| MACADDR00006 | BranchA | bdc3 | bdC | teller loan-officer branch-manager guest | 192.168.0.6 | Branch Manager Workstation (BDC) |
| MACADDR00007 | BranchB | bdc4 | bdC | teller loan-officer branch-manager guest | 192.168.0.7 | Branch Manager Workstation (BDC) |

SYSTEM AND METHOD FOR PLATFORM INDEPENDENT DESKTOP LOCKDOWN

BACKGROUND OF THE INVENTION

1. Technical Field

The present invention relates in general to a system and method for controlling user access to a computer operating environment. In particular, the present invention relates to a system and method for providing a platform-neutral shell application that prevents user access to an underlying operating system.

2. Description of the Related Art

Modern computer software systems often include distributed computing components such as client computer systems and server computer systems. Large organizations may, through time, deploy a number of operating system environments on computer systems distributed throughout the organization. For example, one area of the organization may use Microsoft Windows™ based operating systems on client computers, while another area may use a UNIX-based operating system, such as Linux. Areas may choose different operating system platforms based upon the work being performed by such areas, or based upon purchasing decisions made by management or IT staff.

Computer software systems have computer systems that are often linked to one another using a computer network, such as a local area network (LAN) and/or a wide area network (WAN). Computer systems distributed throughout the organization may communicate with one another using a global computer network, such as the Internet. Communication between computer systems, also called nodes, may be encrypted using technology such as Virtual Private Networks (VPNs) that use encryption to safeguard data that travels over the Internet. In a client/server environment, end-users typically use client computer systems to communicate with applications stored on server computer systems using the computer network.

One challenge in developing software that is deployed on a variety of operating system platforms is designing a user interface that is similar across the various platforms. An enterprise-based system is often deployed across a variety of operating systems. Users of the enterprise-based application are more efficient and productive if the interface, or "look and feel", of the application remains consistent regardless of the underlying operating system. In addition, a challenge of traditional systems is providing a consistent interface for launching native applications. In a banking example, a teller function may be a native application with a different native application used depending on the underlying operating system. Interface consistency and a common look and feel are helpful, therefore, in launching native applications from a variety of operating systems.

Another challenge in developing software that is deployed on a variety of platforms, is insulating the end-user from the underlying operating system. The computer systems distributed throughout the organization often allow the end-user to access the underlying operating system. As a result, end-users make changes to the operating system attributes and may deliberately or unintentionally add or delete files stored on the computer system used by the end-user. These changes may detrimentally affect the operation of the end-user's computer. In addition, these changes are often unexpected, and therefore unanticipated, by IT staff. As a result, IT staff may spend considerable time analyzing and troubleshooting the client computer system. This challenge is aggravated in environments where more than one person, or user, uses the same computer system to perform their job functions.

What is needed, therefore, is a system and method that provides a platform-neutral desktop environment that is deployed on client computer systems. Furthermore, what is needed is a system and method that locks the platform-neutral desktop environment, thus preventing the end-user from making changes to the computer's underlying operating system.

SUMMARY

It has been discovered that the aforementioned challenges are resolved using a system and method that provides a platform-neutral shell application for a user interface. The platform neutral shell application is performed in a way that prevents the user from accessing the underlying operating system.

The desktop shell application executes as a middleware application, such as a Java virtual machine (JVM). The operating system residing on the client computer system is booted when the user turns the client computer system on, or resets the client computer system. The virtual machine middleware application (e.g., JVM) is loaded on the operating system platform. The virtual machine middleware application is programmed for the particular operating system being used by the client. The virtual machine middleware application is adapted to run platform-neutral software applications (e.g., Java applications). The shell application is invoked on the virtual machine middleware application. The shell application prevents the user from accessing the underlying operating system. The user is prevented from accessing the underlying operating system by maximizing the window in which the shell application is running, pinning the shell application window to the foreground, and removing controls from the desktop window which would otherwise allow the user to bypass the desktop shell.

In one embodiment, the platform-neutral shell application is used to receive and display desktop components included in self-contained desktop packages. The desktop components correspond to the functions performed by the user. In a banking example, one set of desktop components are provided for a teller, another set of desktop components are provided for a loan officer, and a third set of desktop components are provided for a branch manager. The desktop shell application receives the self-contained desktops from a server, unpacks the components, and displays them on the desktop shell application window. In addition, a user may perform multiple roles, in which case the user receives multiple desktops corresponding to the different roles. The desktop shell application provides a pop-up window allowing the user to switch from one set of desktop components to another.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 11 is a screen layout of a screen used by an administrator to set up a new site;

FIG. 12 is a screen layout of a screen used by an administrator to manage desktops and machines for a given site;

FIG. 13 is a screen layout of a screen used by an administrator to set up a new user;

FIG. 16 is a screen layout of a screen used by an administrator to manage workstations;

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
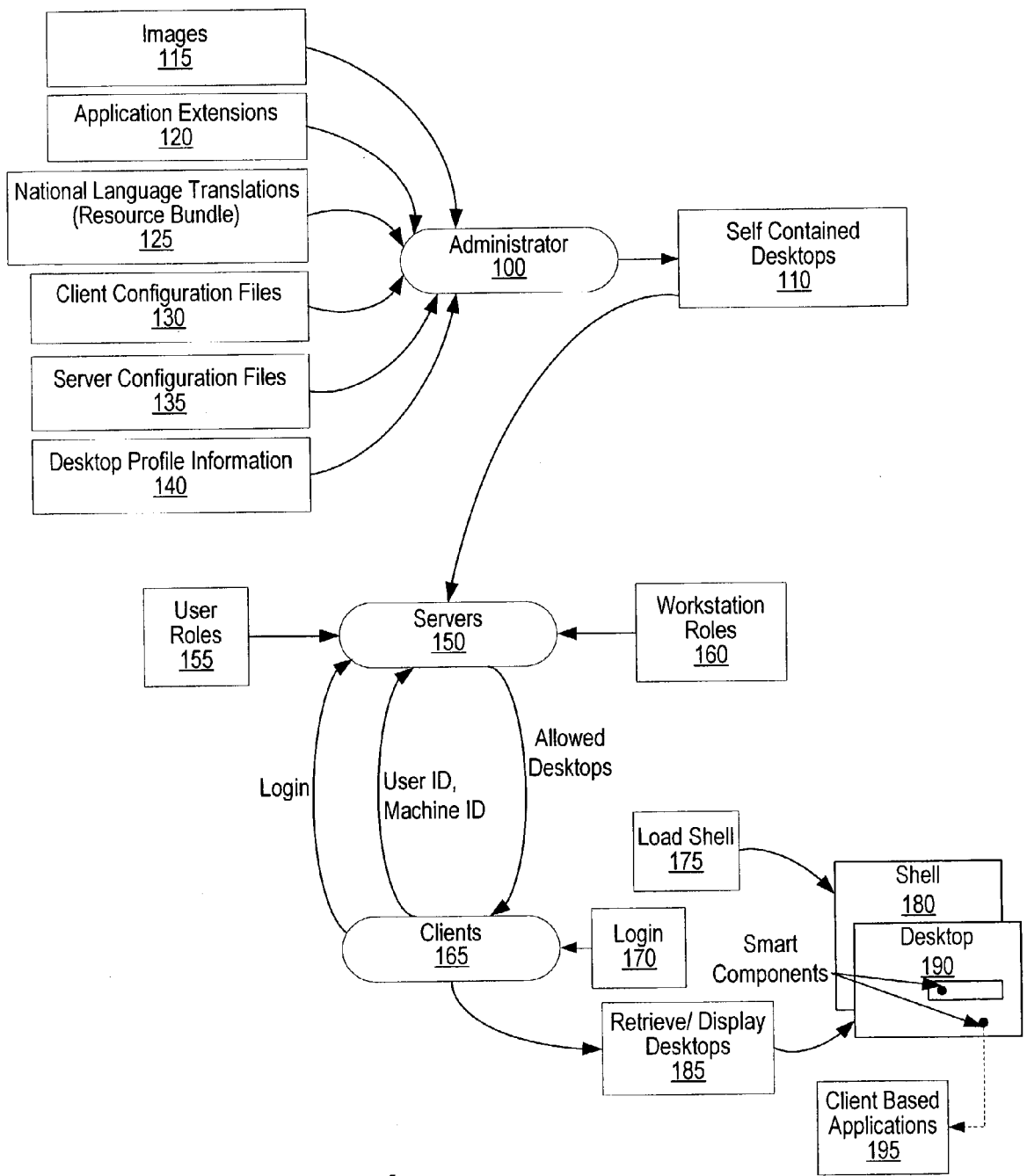
FIG. 1 is a network diagram of a computer system using self-contained desktops.

FIG. 1 is a network diagram of a networked computer system that uses self-contained desktops. Administrator 100 creates self-contained desktops 110 by combining images 115, application extensions 120, national language translations 125, client configuration files 130, server configuration files 135, and desktop profile information 140. Self-contained desktops 110 include all information needed for a client to use components on the client's workstation given the client's particular role.

Self-contained desktops 110 are transmitted to one or more servers 150 for dissemination to clients. Servers 150 combine user roles 155 with workstation roles 160 to determine which self-contained desktops to send to clients. Clients 165 perform login function 170 during which the user ID, and password are gathered and transmitted to servers 150 to effectuate a login. Clients 165 perform login function 170 during which the user ID and machine ID are gathered and transmitted to servers 150 to receive a list of allowed desktops.

Servers 150 receive the user ID, password, and machine ID from clients and determine which self-contained desktops to transmit to the clients based upon the user roles 155 and the workstation roles 160 that correspond to the particular user ID and the particular workstation being used by the client. The identified self-contained desktops are responsively transmitted from server 150 to client 165.

Client 165 performs load shell process 175 to load shell application 180 onto the client workstation. The shell process is an application that is loaded onto a middleware application, such as a Java virtual machine (JVM). In this manner, the shell application appears consistent and substantially similar regardless of the operating system platform being used by the client workstation. Shell application 180 is adapted to retrieve and display self-contained desktops 190. Client 165 receives self-contained desktops based upon the intersection of the user and the workstation identifiers. The self-contained desktops are received and displayed using process 185. A given client can therefore utilize multiple self-contained desktops. These self-contained desktops include toolbars, menus, and other graphical user interface items used to communicate with the user. Some of these user interfaces include functionality that communicate with server applications hosted by servers 150. Other user interfaces include extensions that map to client-based applications 195. When a user clicks on a desktop component that maps to a client-based application, functionality exists within the self-contained desktop to invoke, or otherwise use, the client-based application. If a client has multiple self-contained desktops at its disposal, the user can switch between the various self-contained desktops by using a menu provided by shell application 180. For example, in a banking environment if a user is both a loan officer and a branch manager both of the corresponding self-contained desktops for these roles would be loaded into shell 180 provided that the workstation is capable of performing both of these roles. To perform loan officer functions, the user selects the loan officer desktop from shell application 180. Likewise, to perform branch manager functions, the user selects the branch manager desktop from shell application 180. In addition, a default role can be provided so that the initially displayed desktop corresponds to the user's primary, or default, role.

Figure 2:
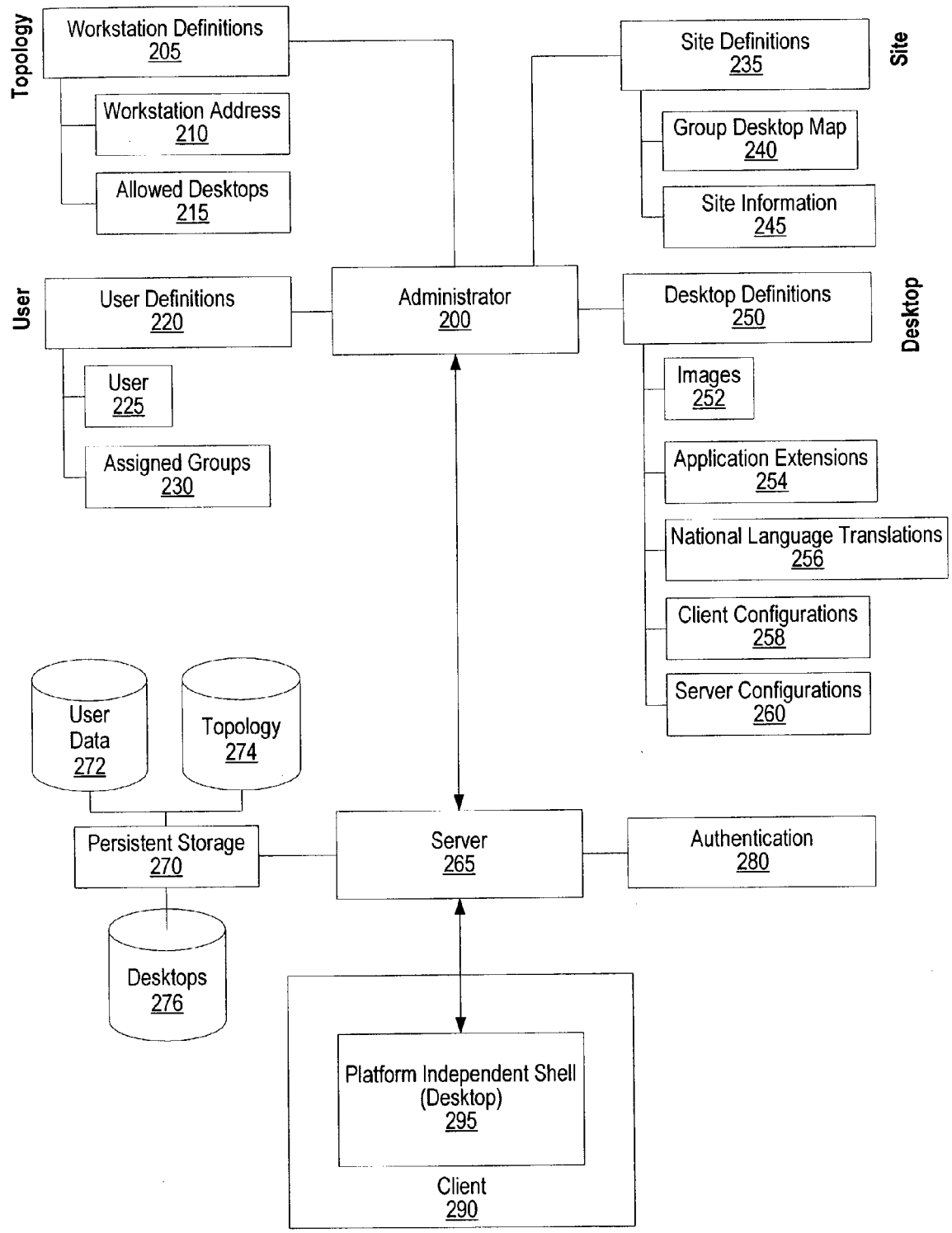
FIG. 2 is a block diagram of components included in providing self-contained desktops.

FIG. 2 is a block diagram of components included in providing self-contained desktops. Administrator 200 defines a topology, user definitions, site definitions, and desktop definitions. Administrator 200 defines a topology by providing workstation definitions 205. Workstation definitions 205 include workstation addresses 210 and allowed desktops 215 that define which roles, or desktops, are allowed to be used on the various workstations. For example, in a banking environment a workstation that is located at a teller window may have special equipment, such as a teller box, so that the workstation is capable, or allowed, to perform teller functions. Another workstation, perhaps at a desk away from the teller area, may be incapable of performing teller functions.

User definitions 220 are used to define the users of the system and the roles such users perform. User definitions 220 include user data 225 and assigned group data 230. User data 225 includes user identifiers and user passwords. Assigned group data 230 includes the roles a particular user is allowed to perform. For example, a branch manager may be allowed to perform branch manager, loan officer, and teller functions while a teller may only be allowed to perform teller functions.

Site definitions 235 include information about a particular site. In a banking environment, a site may be a branch office of the bank. Site definitions 235 include group desktop map 240 that provides a common desktop for users at a particular site as well as site information 245 that provides details concerning the site.

Desktop definitions 250 include components used to create self-contained desktops that are used by clients. Desktop definitions 250 include images 252 that are displayed on the self-contained desktop, and application extensions 254 that provide details about client-based applications that are accessible from the self-contained desktop. Desktop definitions 250 also include resources, such as national language translations 256, so that users are able to select the resources, such as a language preference, that best fits their needs. Desktop definitions 250 also include client configurations 258 and server configurations 260. These configurations include information about the components included with a particular self-contained desktop.

Administrator 200 creates self-contained desktops and publishes the self-contained desktops on one or more servers 265 that are accessible by clients. Server 265 includes persistent storage 270 and authentication function 280. Persistent storage 270 includes user data 272, topology information 274, and self-contained desktops 276. The user data and topology data are used to determine which self-contained desktops 276 are allowed to be used by a given client using a given workstation. Server 265 provides desktops which are authorized for particular user/workstation to client 290. The self-contained desktops are received by the client and displayed on platform independent shell 295. In this manner, server 265 sends identified desktops to client 290 without regard to the particular operating system platform being used by the client.

Figure 3:
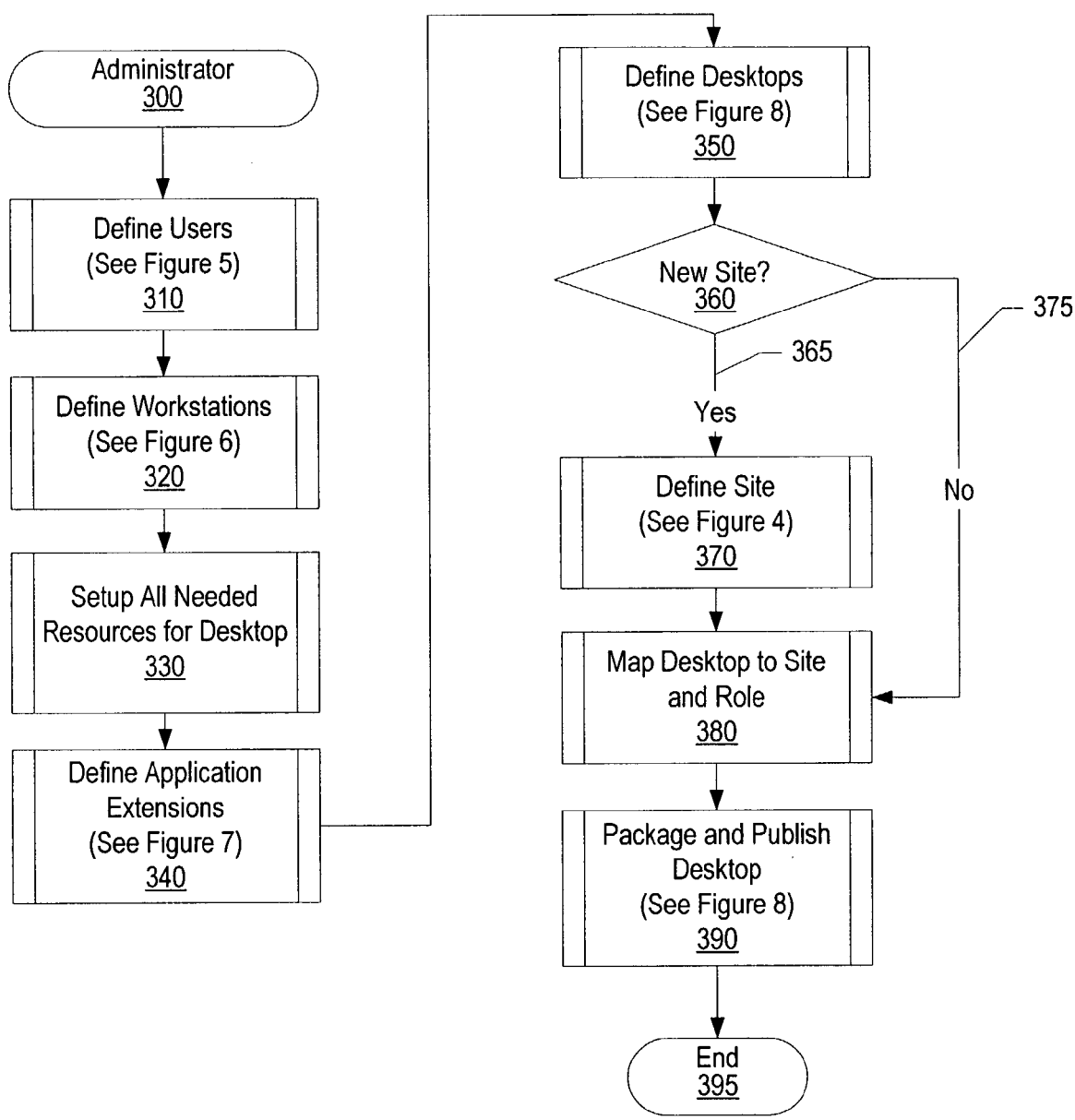
FIG. 3 is a high level flowchart showing administrator steps taken to provide self-contained desktops.

FIG. 3 is a high level flowchart showing steps taken by the administrator to provide self-contained desktops. Administrator processing commences at 300 whereupon the administrator defines users (predefined process 310, see FIG. 5 for further details). The administrator also defines workstations that are used by users of the system (predefined process 320, see FIG. 6 for further details).

Resources that are needed by clients, such as national language translations, are set up so that the resources can be included in self-contained desktops (predefined process 330). Application extensions corresponding to applications available from a workstation are defined (predefined process 340, see FIG. 7 for further details). Self-contained desktops are packaged including all of the components needed to perform a particular job role (predefined process 350, see FIG. 8 for processing details).

A determination is made as to whether a new site is being added (decision 360). If a new site is being added, decision 360 branches to "yes" branch 365 whereupon a new site is defined (predefined process 370, see FIG. 4 for processing details). On the other hand, if a new site is not being added decision 360 branches to "no" branch 375 bypassing step 370.

The defined desktop is mapped to one or more sites and one or more roles (predefined process 380). In this manner, a single desktop can be used at multiple sites for multiple roles. Conversely, a different desktop can be defined and used at each site and for each role. The desktop components are packaged into a self-contained desktop and the self-contained desktop is published to one or more servers for dissemination to the various clients (predefined process 390, see FIG. 9 for processing details). Administrator processing ends at 395.

Figure 4:
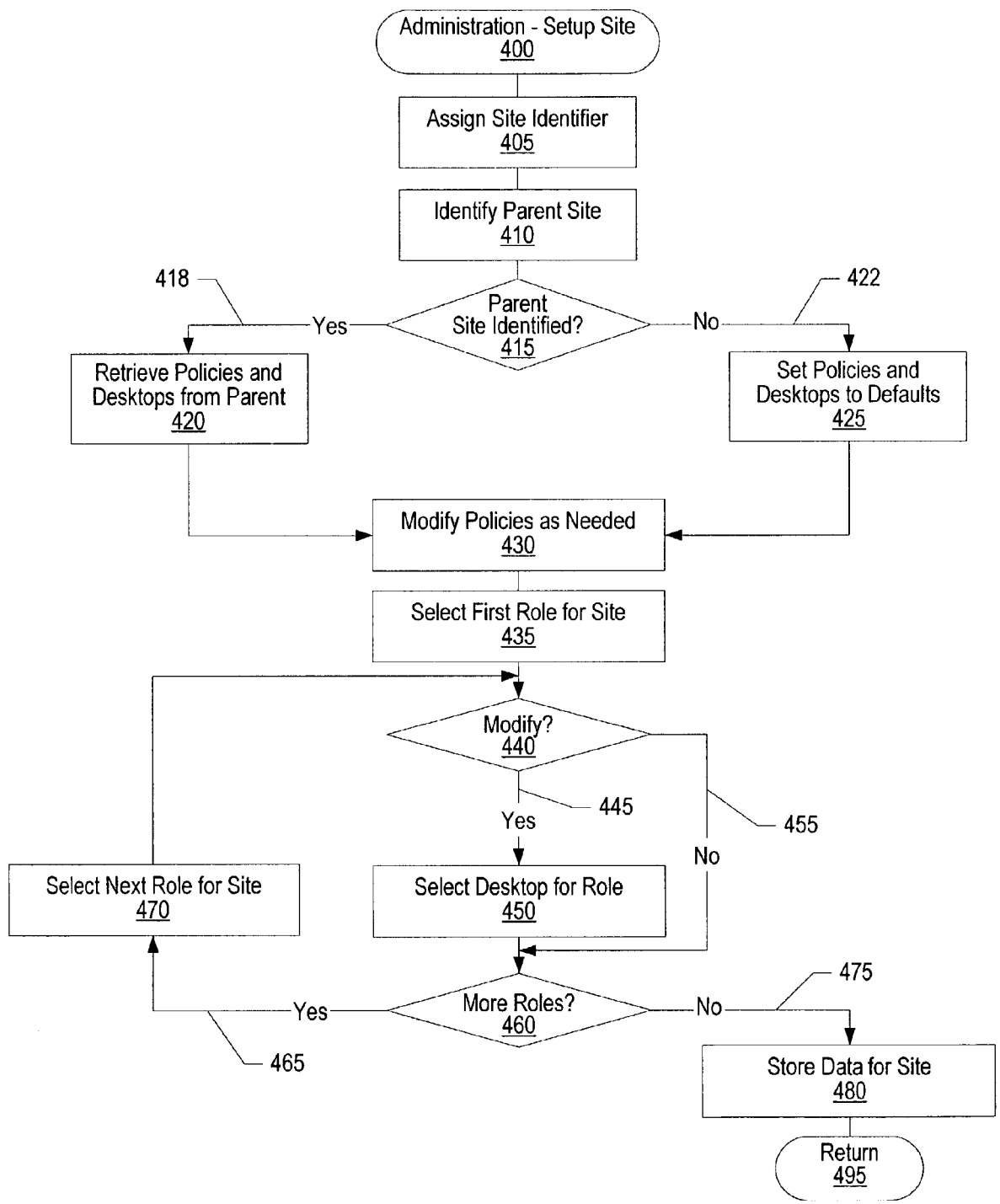
FIG. 4 is a flowchart showing administrator steps taken to set up a particular site.

FIG. 4 is a flowchart showing administrator steps taken to set up a particular site. Processing commences at 400 whereupon a unique identifier is assigned to the site (step 405). A parent site is identified for the site (step 410). For example, a branch office may have a regional office for a parent site. In this manner, the new site can inherit characteristics and attributes from the parent site so that the characteristics and attributes are consistent and do not have to be reentered for each site. A determination is made as to whether a parent site was identified (decision 415). If a parent site was identified, decision 415 branches to "yes" branch 418 whereupon policies and desktops for the parent are retrieved (step 420). On the other hand, if the parent site was not identified decision 415 branches to "no" branch 422 whereupon the administrator sets the policies and desktops to default values for the site (step 425).

Policies that were either retrieved or set for a particular site can be modified according to the particular site's needs (step 430). In this manner, a site can have slightly different policies from those of a parent site. Sites have one or more roles that are performed by users working at sites. In a banking environment, a branch office site may have roles such as a teller, a loan officer, and a branch manager. The first role for the site is selected (step 435). A determination is made as to whether the role needs to be modified (decision 440). If the role needs to be modified, decision 440 branches to "yes" branch 445 whereupon a self-contained desktop is selected for the role (step 450). On the other hand, if the desktop does not have to be modified for the role, decision 440 branches to "no" branch 455 bypassing step 450. In this manner, the child site uses the same desktop as the parent site for a particular role, yet the administrator has the flexibility to assign a different desktop to the child site for a given role.

A determination is made as to whether there are more roles for the site (decision 460). If there are more roles, decision 460 branches to "yes" branch 465 whereupon the next role for the site is selected (step 470) and processing loops back to process the next role. This looping continues until there are no more roles for the site, at which point decision 460 branches to "no" branch 475 whereupon the desktops and other data selected for the site are stored (step 480). Processing then returns at 495.

Figure 5:
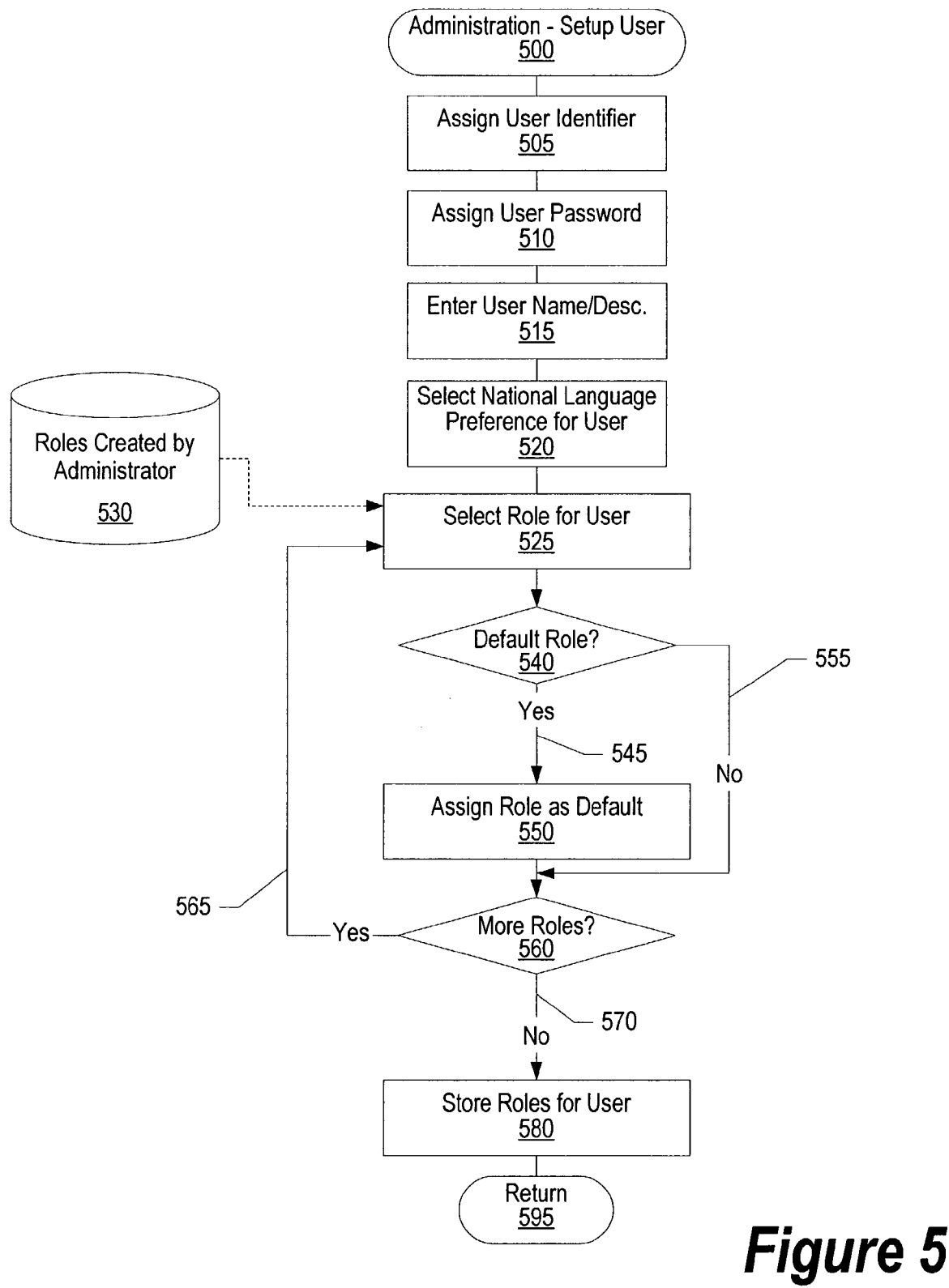
FIG. 5 is a flowchart showing administrator steps taken to set up a user.

FIG. 5 is a flowchart showing steps taken by the administrator to define a new user. Processing commences at 500 whereupon a unique user identifier, such as a user ID, is assigned to the user (step 505). An initial passwords is also assigned to the user (step 510). A user name and/or description is also entered for the user (step 515). A national language preference is selected for the user (step 520).

A role is selected for the user (step 525) from a list of roles that has been created by the administrator and stored in data store 530. A determination is made as to whether the selected role is the default role for the user (decision 540). If the selected role is the default role for the user, decision 540 branches to "yes" branch 545 whereupon the selected role is assigned as the default role for the user (step 550). On the other hand, if the selected role is not the default role, decision 540 branches to "no" branch 555 bypassing step 550.

A determination is made as to whether there are more roles to assign to the user (decision 560). If there are more roles to assign to the user, decision 560 branches to "yes" branch 565 which loops back to select and process the next role for the user. This looping continues until there are no more roles to assign to the user, at which point decision 560 branches to "no" branch 570 whereupon the roles assigned to the user are stored (step 580). Processing then returns at 595.

Figure 6:
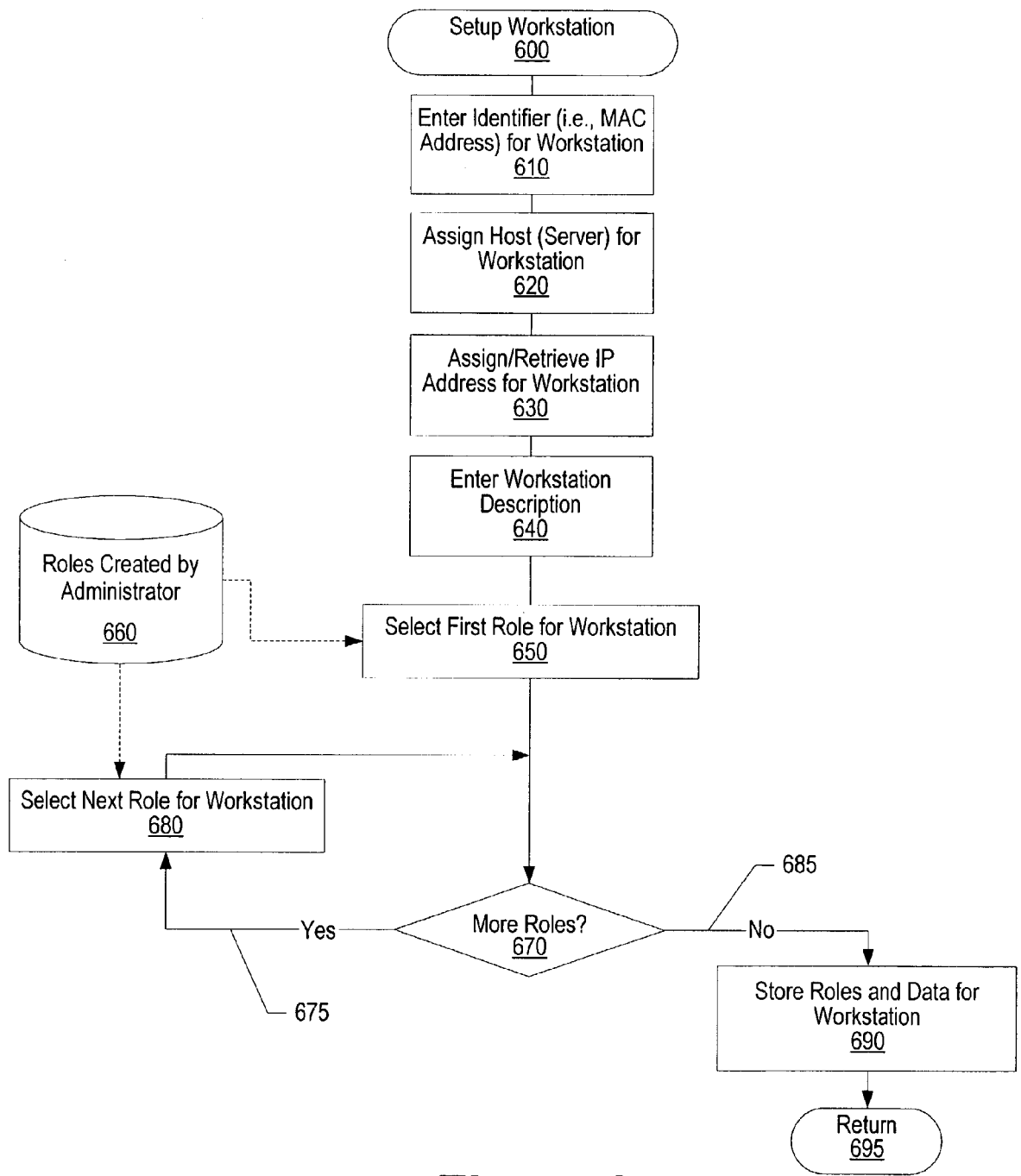
FIG. 6 is a flowchart showing administrator steps taken to set up a workstation.

FIG. 6 is a flowchart showing steps taken by the administrator to set up a workstation. Processing commences at 600 whereupon and identifier, such as a MAC address, if entered for workstation (step 610). A MAC address is a Media Access Control address which is a hardware address that uniquely identifies each node of a computer network. A host, or server, is assigned to the workstation (step 620). An IP address is either assigned or retrieved for the workstation (step 630). A workstation description is also entered for the workstation (step 640). A workstation description may include a description of the workstation's capabilities, such as whether the workstation includes a bank teller drawer.

The first role for the workstation is selected (step 650) from a list of roles that was created by the administrator and stored in data store 660. For example, in a banking environment, roles may include a teller, a loan officer, and a branch manager. One workstation may be capable of performing all three roles, while another is only capable of performing one or two of the roles. Furthermore, confidential or sensitive functions may be restricted to a particular workstation even though other workstations may be physically capable of performing such functions. A determination is made as to whether there are more roles to assign to the workstation (decision 670). If there are more roles to assign to the workstation, decision 670 branches to "yes" branch 675 whereupon the next role for the workstation is selected (step 680). This looping continues until there are no more roles to assign to the workstation, at which point decision 670 branches to "no" branch 685. The assigned roles and workstation data are stored (step 690) in a nonvolatile storage area. Processing then returns at 695.

Figure 7:
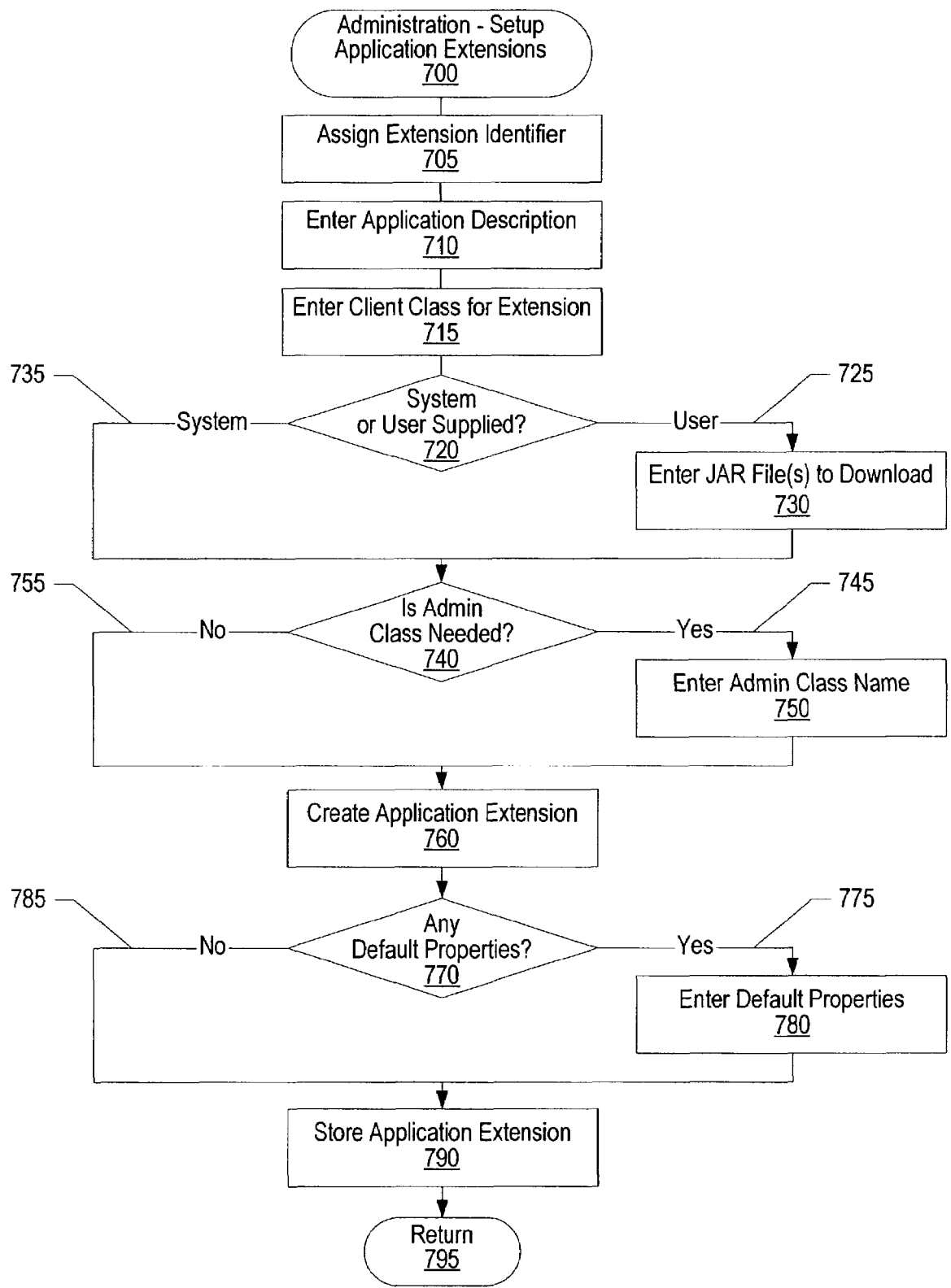
FIG. 7 is a flowchart showing administrator steps taken to set up application extensions.

FIG. 7 is a flowchart showing steps taken by the administrator to set up application extensions. Application extensions are desktop components that provide access to application programs, such as client-based legacy applications. Processing commences at 700 whereupon an extension identifier is assigned to the particular application extension (step 705). An application description is entered describing the corresponding application (step 710). A client class for the application extension is also entered (step 715).

A determination is made as to whether the extension is provided by the system or is provided by the user (decision 720). If the extension is provided by the user, decision 720 branches to user branch 725 whereupon the Java archive (JAR) filenames corresponding to the extension are entered (step 730). On the other hand, if the extension is system supplied, decision 720 branches to system branch 735 bypassing step 730.

A determination is made as to whether an administrator object oriented class is needed (decision 740). If an administrator class is needed, decision 740 branches to "yes" branch 745 whereupon the administrator class name is entered (step 750). On the other hand, if an administrator class is not needed decision 740 branches to "no" branch 755 bypassing step 750.

The application extension is created using the supplied information (step 760). A determination is made as to whether there are any default properties for the application extension (decision 770). If there are default properties, decision 770 branches to "yes" branch 775 whereupon the default properties are entered for the application extension (step 780). On the other hand if there are no default properties for the application extension, decision 770 branches to "no" branch 785 bypassing step 780.

The application extension, along with any default properties, is stored (step 790) in a nonvolatile storage area. Processing then returns at 795.

Figure 8:
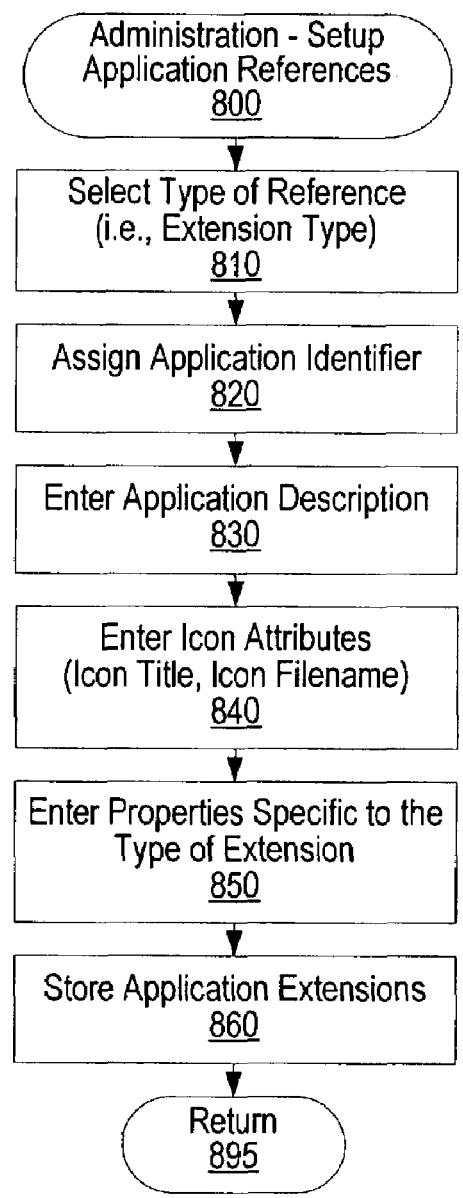
FIG. 8 is a flowchart showing administrator steps taken to set up application references.

FIG. 8 is a flowchart showing administrator steps taken to set up application references. Processing commences at 800 whereupon the type of reference (i.e., the extension type) corresponding to the application reference is selected (step 810). A unique application reference identifier is assigned to the application reference (step 820). An application description is also provided for the application reference (step 830). Icon attributes, such as the icon titles and icon filenames, are also provided (step 840). Properties that are specific to the type of the application extension are also entered (step 850).

The application reference is then stored in a nonvolatile storage area (step 860) and processing returns at 895.

Figure 9:
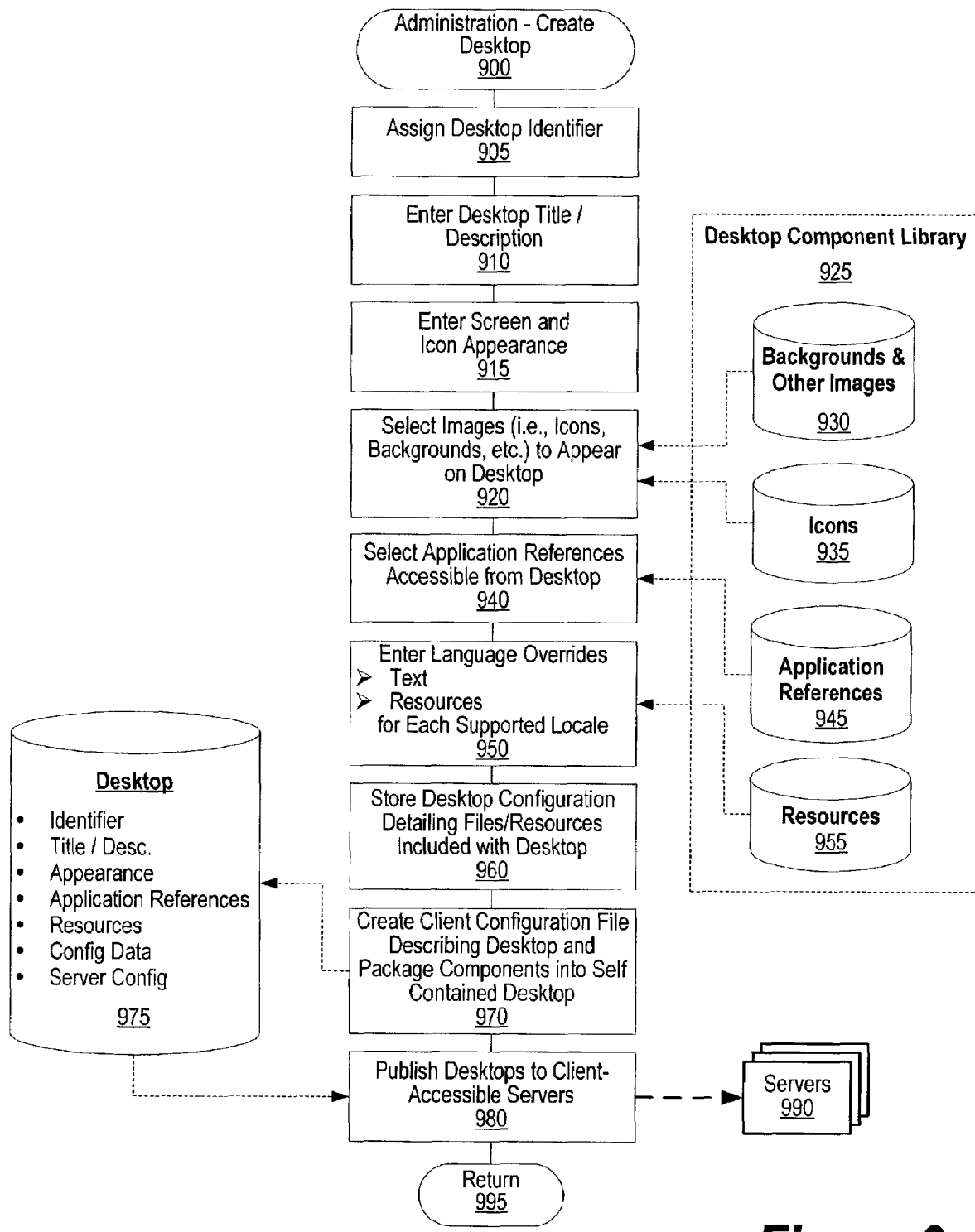
FIG. 9 is a flowchart showing administrator steps taken to create self-contained desktops.

FIG. 9 is a flowchart showing steps taken by an administrator to create self-contained desktops. Processing commences at 900 whereupon a unique desktop identifier is assigned to the self-contained desktop (step 905). A desktop title and/or description is entered for the desktop (step 910). The screen and icon appearance is entered for the desktop (step 915). The administrator then selects images, such as icons, backgrounds, etc., to appear on the desktop (step 920). These images are selected from desktop component library 925. The desktop component library 925 includes backgrounds and other images 930, icons 935, application references 945, and resources 955.

Application references that will be available from the desktop are selected (step 940) from application references 945 included in desktop component library 925. In a banking environment, a teller's desktop can include application references to look up customer bank balances and operate the teller's cash drawer, while a loan officer's desktop can include application references that provide access to the bank's loan approval software application. National language data, such as text and resources, are provided for each supported locale (step 950). These resources are selected from resources 955 that are included in desktop component library 925.

The desktop configuration is stored detailing the files and resources included the desktop (step 960). A client configuration file describing the desktop is created and the desktop data is packaged (step 970) resulting in self-contained desktop 975. The resulting self-contained desktop is published to client-accessible servers (step 980) by transmitting the desktops to servers 990. Processing then returns at 995.

Figure 10:
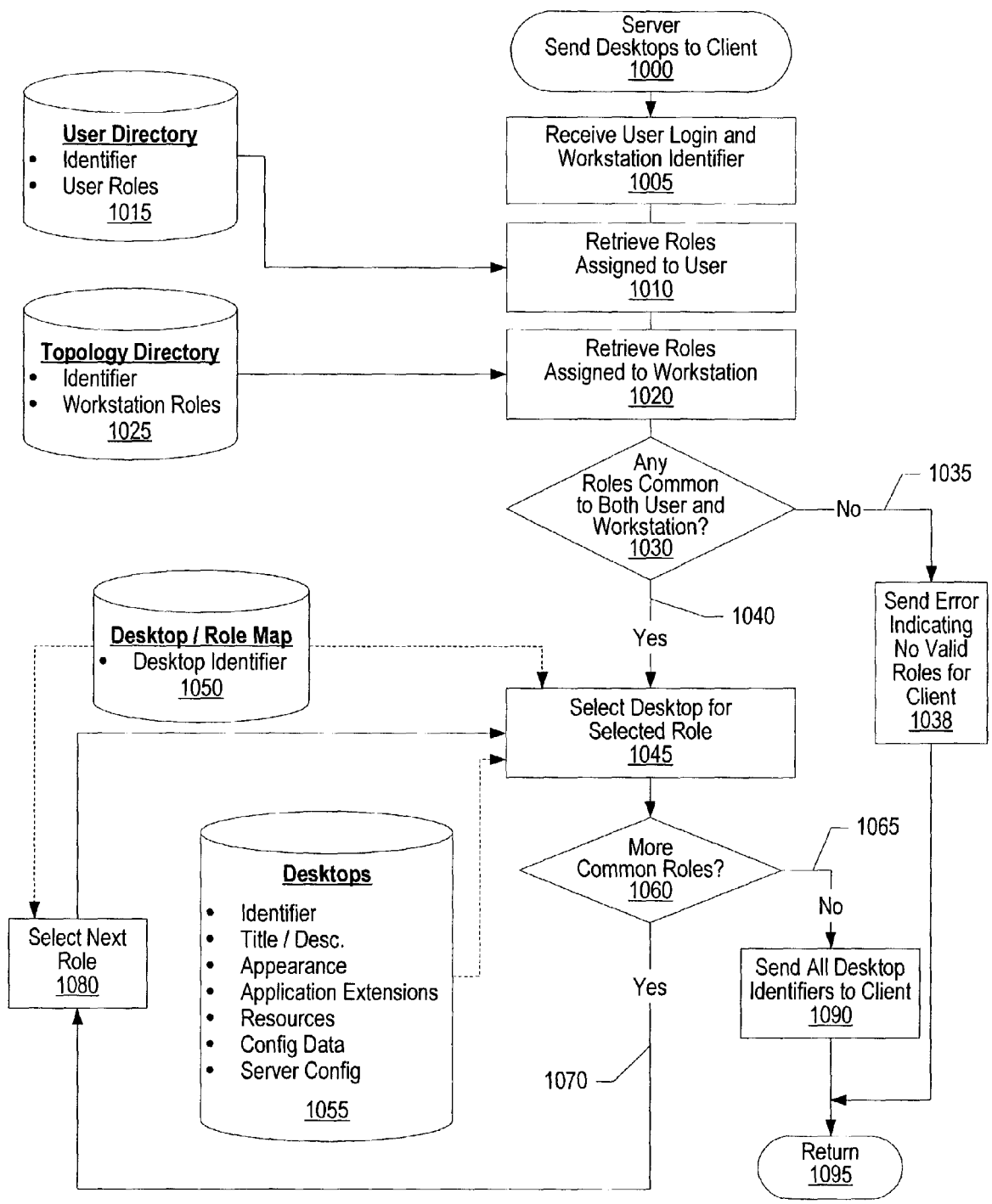
FIG. 10 is a flowchart showing steps taken by a server to deliver self-contained desktops to a client.

FIG. 10 is a flowchart showing steps taken by a server to deliver self-contained desktops to a client. Processing commences at 1000 whereupon the server receives a user login and workstation identifier (step 1005). The user login includes a user identifier and a user password used to authenticate the user. Roles that have been assigned to the user are retrieved (step 1010) from user directory data store 1015. Roles that have been assigned to the workstation are retrieved (step 1020) from topology directory 1025.

A determination is made as to whether any roles assigned to the user match any roles assigned to the workstation (decision 1030). If there are no roles in common, decision 1030 branches to "no" branch 1035 whereupon an error is returned to the client (step 1038) and processing returns at 1095. On the other hand, if there are one or more roles in common, decision 1030 branches to "yes" branch 1040 whereupon the first desktop for the selected role is retrieved from desktop/role map 1050 and the corresponding self-contained desktop is retrieved from data store 1055. A determination is made as to whether there any more roles in common between the user and the workstation (decision 1060). If there are more roles in common, decision 1060 branches to "yes" branch 1070 whereupon the next common role is selected (step 1080) and processing loops back to retrieve the corresponding self-contained desktop. This looping continues until there are no more roles in common between the user and workstation, at which point decision 1060 branches to "no" branch 1065 whereupon the retrieved desktop identifiers (i.e. those identifiers in common for both the user and the workstation) are sent to the client (step 1090). Processing then returns at 1095.

FIG. 11 is a screen layout of a screen used by an administrator to set up a new site (see FIG. 4 for a corresponding flowchart). The administrator uses screen layout 1100 to define a new site. The administrator enters a unique site identifier in text box 1150. If the new site is a child of a site that has already been created, the parent site is selected from list box 1105. List box 1105 includes a list of previously defined site identifiers. Frame 1110 includes policy information that is used for the site. Policy information includes a policy name 1115, a policy value 1120, and inheritance data 1125. Inheritance data 1125 includes inheritance value 1130 and inheritance ancestor 1135. In the example shown, the policy name is "newbDC" and the value of the policy is inherited from the parent site. The inheritance value is "allow" and the inheritance ancestor is the "root" or uppermost site in the site hierarchy.

Desktop frame 1140 includes information about the roles and desktops available at the site. Desktop frame 1140 includes role data 1155, desktop data 1160, and inheritance data 1170. The inheritance data includes the name of the desktop that is inherited 1175 and the name of the ancestor 1180 from which the desktop is inherited. In the example shown, the roles included at the site include the administrator, a branch manager, a guest, a loan officer, and a teller. Each of the desktops is inherited from the parent site as shown by the "[Inherited]" value for the desktop field. The administrator, branch manager, and loan officer desktops are inherited from "BranchA" site, while the guest and teller desktops are inherited from the "root" site. In this manner, self-contained desktops can be selected from a variety of parent sites or can be specifically configured for the child site.

When the new site data has been entered, the administrator selects "Create Site" command button 1190 to create the new site. If the administrator makes mistakes and wishes to reset the values, the administrator can select "Reset Values" command button 1195.

FIG. 12 is a screen layout of a screen used by an administrator to manage desktops and machines for a given site. The administrator uses screen layout 1200 to manage desktops for a given site as well as to add and manage workstations that correspond to the site. The top half of screen layout 1200 is similar to the new site layout shown in FIG. 11. List box 1205 is used to select the parent site to assign to the site. The parent site can be changed to accommodate changes within the organization. Policy frame 1210 include the name of the policy 1212, the policy value 1214, and inheritance data 1216. The inheritance data includes inheritance value 1218 and ancestor value 1220. In the example shown, the policy name is "newbDC" which is inherited from the "root" ancestor.

Desktop frame 1225 includes role data 1230, desktop data 1235, and desktop inheritance data 1240. In the banking example that is shown in FIG. 12, the roles included for the site consist of an administrator, a branch manager, the guest, a loan officer, and a teller. The desktop to be used by the administrator, branch manager, guest, loan officer, and teller. Each of these roles is shown in desktop data 1235. Some of the values are inherited from a parent site while others are specified to be a particular self-contained desktop. Desktop inheritance data includes desktop inheritance 1242 and ancestor data 1244. In the example shown, the administrator, branch manager, and loan officer each inherit desktop data from "BranchA", while the guest and teller each inherit desktop data from the "root" parent.

If the administrator changes the site data and wishes to store the changed site information, the administrator selects "Submit Changes" command button 1245. If the administrator wishes to reset the site values, the administrator selects "Reset Values" command button 1250. If the administrator wishes to delete the site, the administrator selects "Delete Site" command button 1255.

When the administrator is ready to publish the site to the servers, the administrator selects "Publish" command button 1260. If the administrator wishes to publish the site along with any sites that are children of the site, the administrator selects "Publish with Children" command button 1265.

Child sites frame 1270 includes data regarding any sites that are children of the site. Child site data includes site name 1272 and site policies 1278. To create a new child site, the administrator can select "<New Site>" hyperlink 1275 which will allow the administrator to identify a new child site.

Machines frame 1280 includes data about workstations included at the site. Workstation data includes the workstation identifier 1282, the host name for the workstation 1284, the workstation type 1286, the roles provided by the workstation 1288, the workstation's IP address 1290, and the workstation description 1292. To add a new machine (workstation) to the site the administrator selects "<New machine>" hyperlink 1295.

FIG. 13 is a screen layout of a screen used by an administrator to set up a new user (see FIG. 5 for a corresponding flowchart). Screen layout 1300 includes text box 1305 for entering the new user's unique identifier. The user's full name is entered in text box 1310. In addition, the description of the user can be entered in text box 1315. For example, a user ID may be set up as a generic identifier such as a guest or teller that can be used by someone without having to establish a new user identifier for such infrequent or part-time users. The user identifiers used for such generic purposes can be further described using description text box field 1315.

A new initial password is entered for the user in text box 1320. This new initial password is confirmed by the administrator by reentering the password in text box 1325. A default locale is selected by the administrator for the user using list box 1330. In the example shown, the locale has been selected to be a U.S. locale for a user speaking U.S. English. However, if the user's primary language was Spanish or some other language, the appropriate locale is selected from the list provided in list box 1330.

Frame 1332 is used by the administrator to select the roles that correspond to the user. Default role 1335 includes a number of radio buttons corresponding to each of the available roles. Radio buttons are used so that the administrator only selects one default role for the user. Select column 1340 includes a number of checkboxes corresponding to each of the available roles. The administrator selects each of the checkboxes corresponding to each role that is performed by the user. Name column 1345 includes the name of each of the available roles. In the example shown, the available roles include an administrator, branch manager, the guest, a loan officer, and a teller. The administrator can select one or more of these roles by selecting the corresponding checkboxes in column 1340. In addition, the administrator can establish a new role by selecting "<New Role>" hyperlink 1350.

When the administrator is finished entering the user data and assigning roles to the user, the administrator selects "Create User" command box 1355 to create and store the user data and assigned roles. If the administrator makes mistakes and wishes to reset the values, "Reset Values" command button 1360 is selected.

Figure 14:
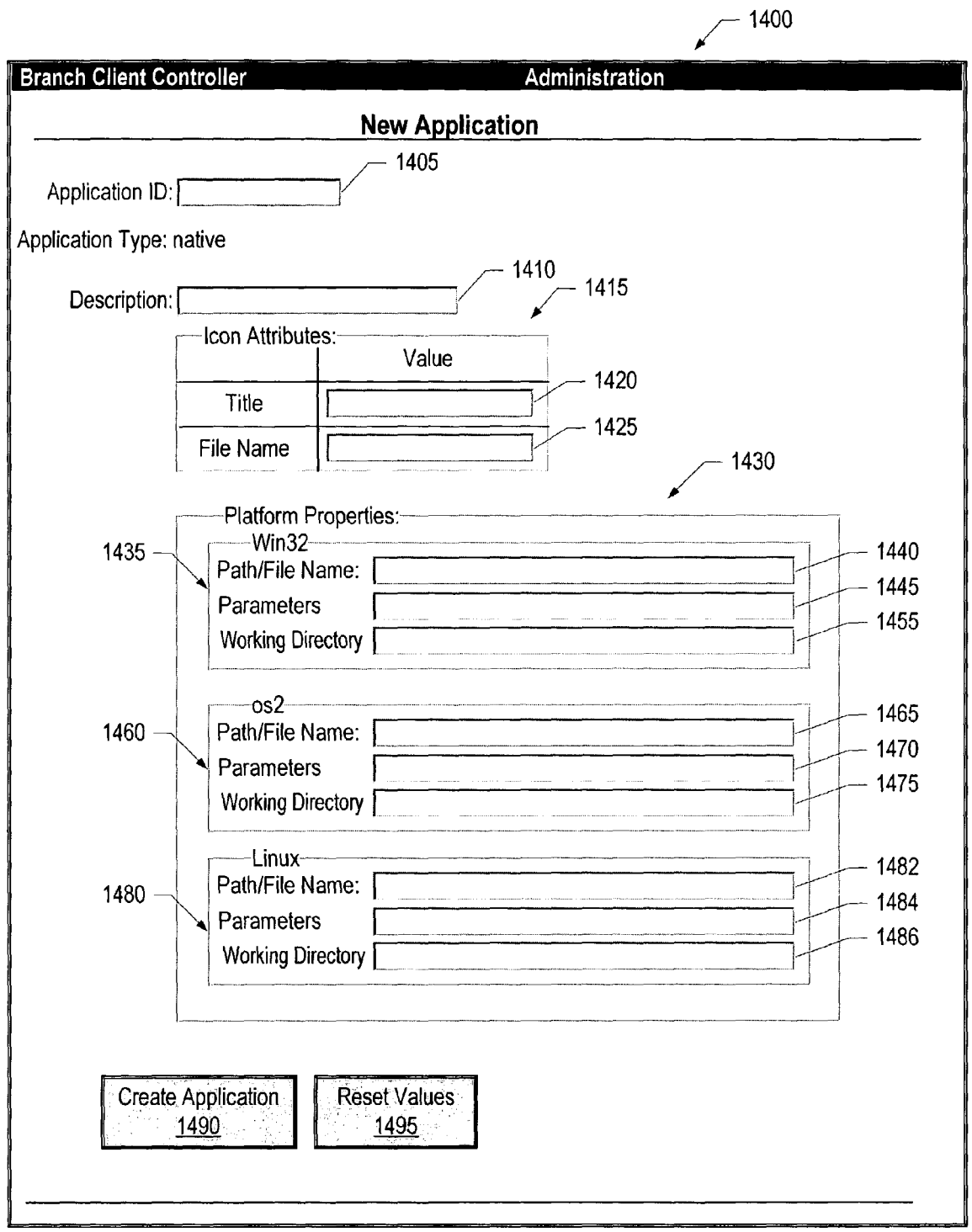
FIG. 14 is a screen layout of a screen used by an administrator to set up an application that is available as a component within one or more self-contained desktops.

FIG. 14 is a screen layout of a screen used by an administrator to set up an application that is available as a component within one or more self-contained desktops (see FIG. 7 for a corresponding flowchart). Screen layout 1400 is used to define a new application that can be included in self-contained desktops. Application identifier text box 1405 is used by the administrator to enter a unique application identifier that corresponds to the application that is being defined. In the example shown in FIG. 14, the type of application being defined is a "native" application, in other words an application wherein at least some of the application's executables reside on the client workstation.

A description of the application that is being defined is entered in description text box 1410. Icon attributes frame 1415 is used to define the attributes corresponding to the icon that will appear on the desktop and be used by the user to select the application. Icon attributes include a title that is entered in text box 1420 and an icon filename that is entered in text box 1425.

Platform properties frame 1430 includes data for each of the supported operating system platforms from which the application can be invoked. Win32 frame 1435 includes data which is used to invoke and execute the application from a Microsoft Windows operating system platform. The Win32 data includes a path and filename identifying the executable form of the application in the Win32 environment. The path and filename is entered in text box 1440. Any parameters that are needed for the application are supplied in parameters text box 1445. A working directory that corresponds to the application, if needed, is entered in text box 1455.

Platform properties frame 1430 also includes data for the OS/2 operating system platform, the fields for which are located in frame 1460. The OS/2 fields correspond to the Win32 fields described above. These include path and filename text box 1465, parameters text box 1470, and working directory text box 1475. Likewise, a Linux set of fields is provided in frame 1480 which includes path and filename text box 1482, parameters text box 1484, and working directory text box 1486.

When the application information has been entered by the administrator, the administrator can create the application by selecting "Create Application" command button 1490. If the administrator makes mistakes, a new application values can be reset by selecting "Reset Values" command button 1495.

Figure 15:
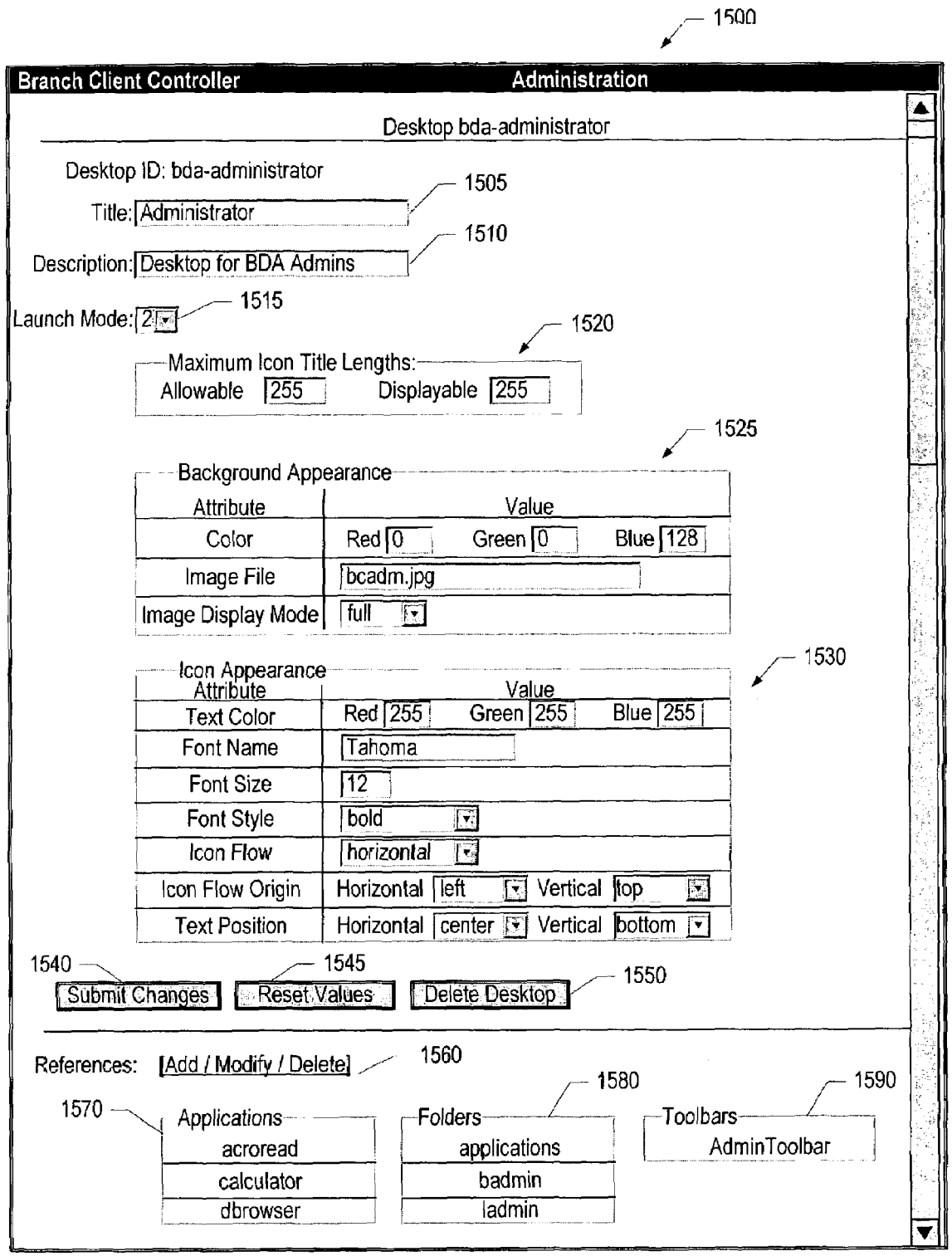
FIG. 15 is a screen layout of a screen used by an administrator to set up native applications.

FIG. 15 is a screen layout of a screen used by an administrator to set up a self-contained desktop. Screen layout 1500 includes various fields used to define the appearance and functionality of a self-contained desktop. The desktop identifier, which was previously defined, is displayed on the screen. In the example shown, the desktop identifier is "bda-administrator." The title for the self-contained desktop is entered by the administrator in text box 1505. In the example shown, the title is "Administrator." A description for the self-contained desktop is entered in text box 1510. In the example shown, the description entered is "Desktop for BDA Admins."

A launch mode for the self-contained desktop is selected by the administrator using list box 1515. The launch mode indicates the number of mouse clicks needed to activate a component from the desktop. In the example shown, the launch mode selected is "2" (i.e., a double-click). Icon attributes are entered in frame 1520. Maximum allowable and displayable icon title lengths are entered by the administrator in the appropriate text boxes.

Background appearance information is entered by the administrator in frame 1525. The color, image file, and image display mode are provided by the administrator for the background of the self-contained desktop. For example, desktop background data can include the name and logo of the organization. Icon appearance information is entered by the administrator in frame 1530. Icon appearance data includes the text color of the icon, the font that is used with the icon, the font size that is used with the icon, the font style that is used to the icon, the icon flow, the origination point of the icon flow, and the text position for the icon text.

When the administrator has completed setting up the self-contained desktop, the administrator selects "Submit Changes" command button 1540 to save the desktop settings. If the administrator makes mistakes or wishes to reset the values, the administrator selects "Reset Values" command button 1545. If the administrator wishes to delete the self-contained desktop definition, the administrator selects "Delete Desktop" command button 1550.

Hyperlink 1560 is used to add, modify, or delete references that are available from the self-contained desktop. The references that are available include applications 1570, folders 1580, and toolbars 1590. In the example shown, the applications that had been included consist of "acroread," "calculator," and "browser." The folders that are included consist of an applications folder, and two administrator folders. One toolbar, the Admin Toolbar, is also included.

FIG. 16 is a screen layout of a screen used by an administrator to manage workstations (see FIG. 6 for a corresponding flowchart). Screen layout 1600 is used by the administrator to manage the workstations, or computer systems, used throughout the network. Data maintained for each of the workstations includes the workstation identifier which is listed in column 1610, the site to which the workstation belongs which is listed in column 1620, the host (or server) assigned to the workstation which is listed in column 1630, the types of functions performed by the workstation which are listed in column 1640, the roles that the workstation is allowed to perform which are listed in column 1650, the workstation's IP address which is listed in column 1660, and a description for the workstation which is listed in column 1670.

The identifiers shown in column 1610 are unique for each workstation. In the example shown in FIG. 16, the identifiers are the MAC addresses that correspond to the workstations. The sites shown in FIG. 16 are either the "root" site, branch "A", or branch "B." These sites may represent physical or logical regions within the organization. The host name is the name of the server used by the workstation. The types of functions performed by the workstation include administration functions, server functions, and client functions. Types ending with "A" are used for administration functions, types ending with "S" are used for server functions, and types ending with "C" are used for client functions. As can be seen in FIG. 16, some workstations perform multiple types of functions. For example, the first workstation listed serves both administrator and server functions. Roles indicate the functions allowed to be performed on the workstation. Roles typically relate to client functions, so therefore workstations that do not have a client type do not have roles assigned. Workstations that have assigned roles often have multiple roles. For example, the third workstation listed has four roles that are allowed to be performed on the workstation (teller, loan-officer, branch manager, and guest). However, the fourth and fifth workstation shown only have one role that is allowed to be performed on each workstation. The IP address is the network address that is assigned to the workstation. In some environments the IP address is a static address, while in other environments the IP address is dynamically assigned. The description of each workstation is optional, yet helps the administrator better identify particular workstations and the roles such workstations play.

Figure 17:
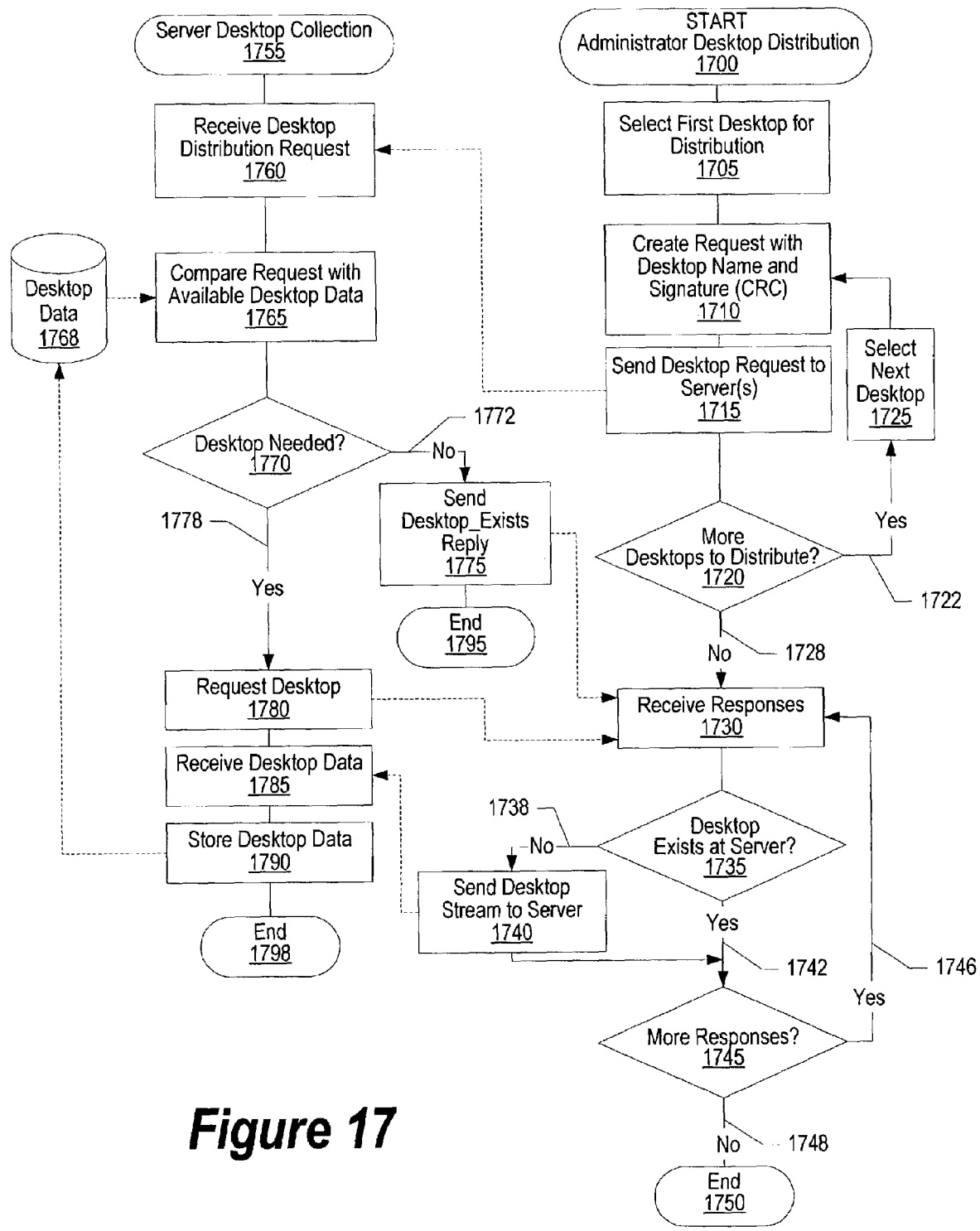
FIG. 17 is a flowchart showing steps taken to distribute self-contained desktops to servers.

FIG. 17 is a flowchart showing steps taken to distribute self-contained desktops to servers. Administrator desktop distribution processing commences at 1700 whereupon the first desktop for distribution is selected (step 1705). A request is created with the desktop name and a unique signature, such as a CRC value (step 1710). The created desktop request is sent to one or more servers (step 1715). A determination is made as to whether there are more desktops to distribute (decision 1720). If there are more desktops to distribute, decision 1720 branches to "yes" branch 1722 whereupon processing selects the next desktop for distribution (step 1725) and loops back to create the request and send the request to the servers. This looping continues until there are no more desktops to distribute, at which point decision 1720 branches to "no" branch 1728.

Server responses resulting from the previously sent desktop request are received by the administrator (step 1730). A determination is made based upon the response as to whether the desktop already exists at the server (decision 1735). If the desktop does not yet exist at the server, decision 1735 branches to "no" branch 1738 whereupon the identified desktop is sent to the server in a data stream (step 1740). On the other hand, if the desktop already exists at the server decision 1735 branches to "yes" branch 1742 bypassing step 1740.

A determination is made as to whether there are more responses to receive from servers regarding the desktop request (decision 1745). If there are more responses, decision 1745 branches to "yes" branch 1746 to loop back and process the responses. This looping continues until there are no more responses to process, at which time decision 1745 branches to "no" branch 1748 and administrator desktop distribution processing ends at 1750.

Server desktop collection processing commences at 1755 whereupon the server receives the desktop distribution request sent by the administrator (step 1760). The unique identifier for the desktop included in the administrator's request is compared with desktop data 1768 that is currently on hand at the server (step 1765). A determination is made based upon the comparison as to whether the desktop is needed by the server (decision 1770). If the desktop is not needed (i.e. the desktop already exists at the server) decision 1770 branches to "no" branch 1772 whereupon a message is sent to the administrator indicating that the server already has the desktop (step 1775) and server processing ends at 1795.

On the other hand, if the server does not yet have the desktop decision 1770 branches to "yes" branch 1778 whereupon the server request the desktop (step 1780). The server receives the desktop data stream in response to the request (step 1785). The server then creates a self-contained desktop file from the received data stream and stores the desktop file in desktop data storage area 1768 (step 1790). Server desktop collection processing then ends at 1798.

Figure 18:
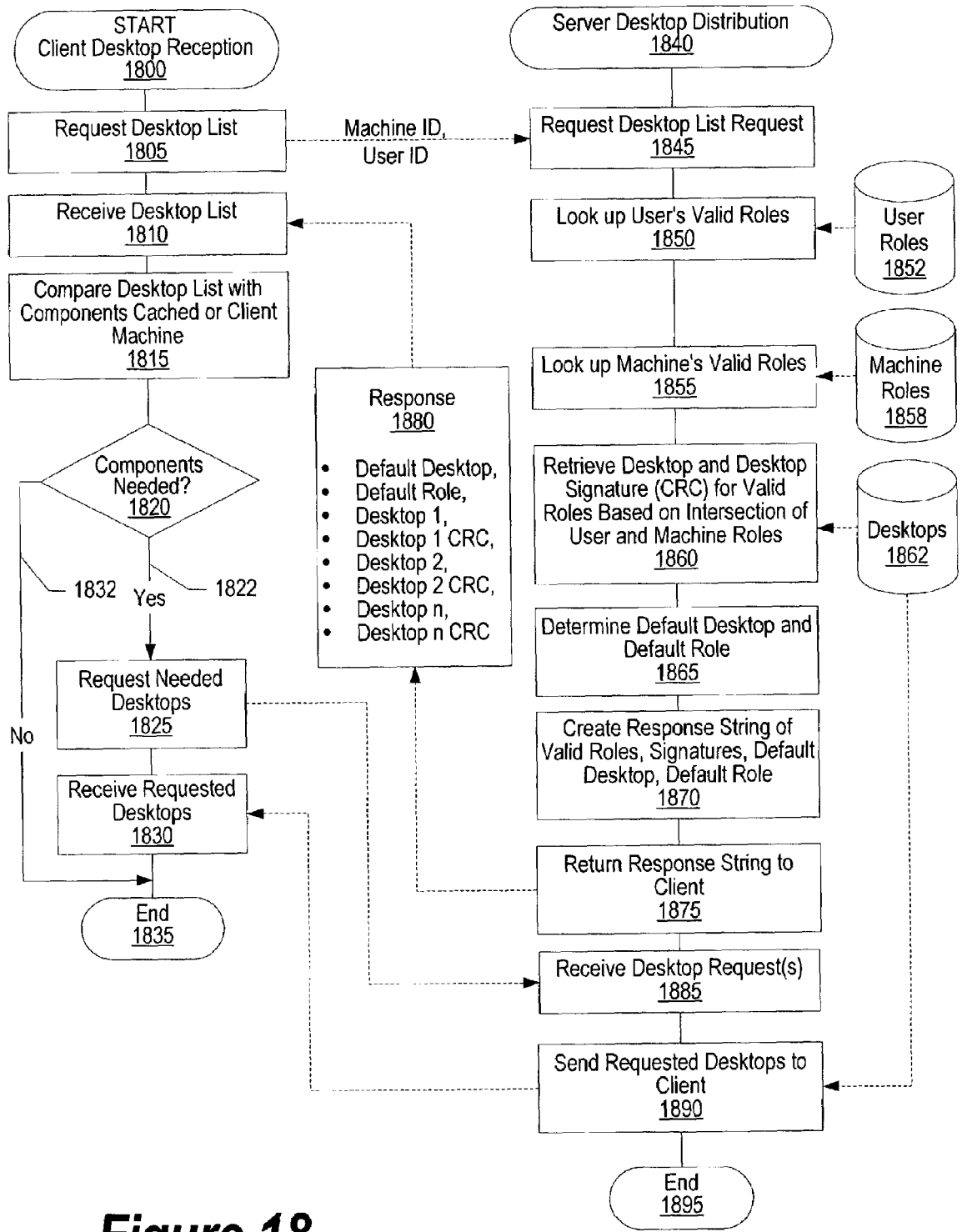
FIG. 18 is a flowchart showing steps taken to distribute self-contained desktops from a server to a client.

FIG. 18 is a flowchart showing steps taken to distribute self-contained desktops from a server to a client. Client desktop reception commences at 1800 whereupon the client sends a desktop list request to a server (step 1805). The desktop list request includes the client's machine (workstation) identifier and the client's user identifier.

Server desktop distribution processing commences at 1840 whereupon the server receives the desktop list request from the client (step 1845). The server looks up the roles that have been assigned to the user (step 1850) by searching user roles data store 1852. The server also looks up the roles that have been assigned to the workstation being used by the user (step 1855) by searching machine roles data store 1858.

The server retrieves desktop information based upon the intersection, or overlap, between the user roles and the machine roles (step 1860) and locates the desktops that correspond to the overlapping roles in desktop data store 1862. The desktop information that is retrieved includes a desktop identifier and a desktop signature, such as a CRC, that is used to uniquely identify the desktop. A user may have a default role and a default desktop that corresponds that role. If the user has a default role, the server determines the default role (step 1865).

The server creates a response string (step 1870) of valid roles, desktop signatures, a default desktop identifier (if applicable), and a default role (if applicable). The server then returns the response string to the client (step 1875).

The client receives the desktop list that includes the roles that have been assigned to both the user and the workstation along with any default role and default desktop information from the server (step 1810). The client compares the desktops included in the desktop list with desktops that have already been cached on the client workstation (step 1815). This is done so that the client only needs to request those desktops that have not previously been transmitted to the client workstation and cached in the workstations volatile or nonvolatile storage areas.

The client determines whether additional components, or desktops, are needed from the server by identifying such desktops or components that have not yet been cached on the client workstation (decision 1820). If the client determines that no additional desktop components are needed, decision 1820 branches to "no" branch 1832 (bypassing the steps used to request and retrieve additional desktop information) and client processing ends at 1835.

On the other hand, if the client needs additional components or desktops, decision 1820 branches to "yes" branch 1822 whereupon the needed desktops are requested from the server (step 1825). This request is received by the server at server step 1885. The server responds by retrieving the request desktop information from desktop data store 1862 and returning it to the client workstation (step 1890). The server desktop distribution processing then ends at 1895.

Returning to client processing, the client receives and caches the requested desktop information at step 1830 and client desktop reception processing ends at 1835.

Figure 19:
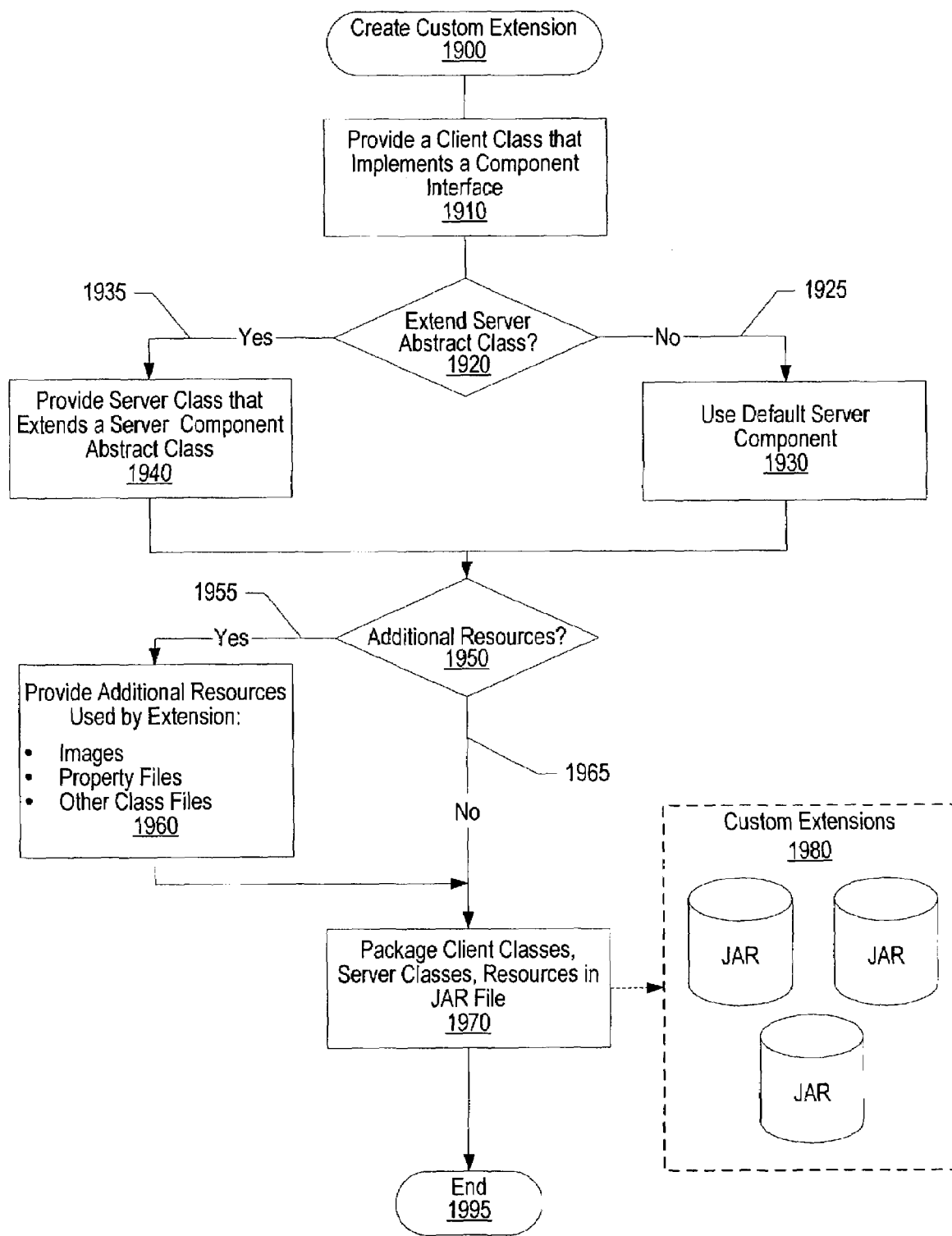
FIG. 19 is a flowchart showing steps taken to create custom application extensions.

FIG. 19 is a flowchart showing steps taken to create custom application extensions. Custom application extensions allow a third party to extend a preexisting object oriented class to modify the behavior or attributes of a server class object to better serve the needs of a particular organization. Custom application extension creation processing commences at 1900 whereupon the client object oriented class is provided that implements a particular component interface (step 1910). A determination is made as to whether to extend the server abstract class (decision 1920). If the abstract class is not being extended, decision 1920 branches to "no" branch 1925 whereupon the default server component is used for the component interface (step 1930). On the other hand, if the abstract class is being extended, decision 1920 branches to "yes" branch 1935 whereupon the server class that extends the server component abstract class is provided (step 1940).

A determination is made as to whether additional resources are needed for the custom application extensions (decision 1950). If additional resources are needed, decision 1950 branches to "yes" branch 1955 whereupon the additional resources used by the application extension are provided (step 1960). The additional resources may include images, property files, and other class files used by the application extension. On the other hand, if additional resources are not needed decision 1950 branches to "no" branch 1965 bypassing step 1960.

The client classes, server classes, and any additional resources are packaged in Java archive (JAR) files (step 1970). The packaged custom extensions are stored in custom extensions library 1980. The creation of custom application extension process ends at 1995.

Figure 20:
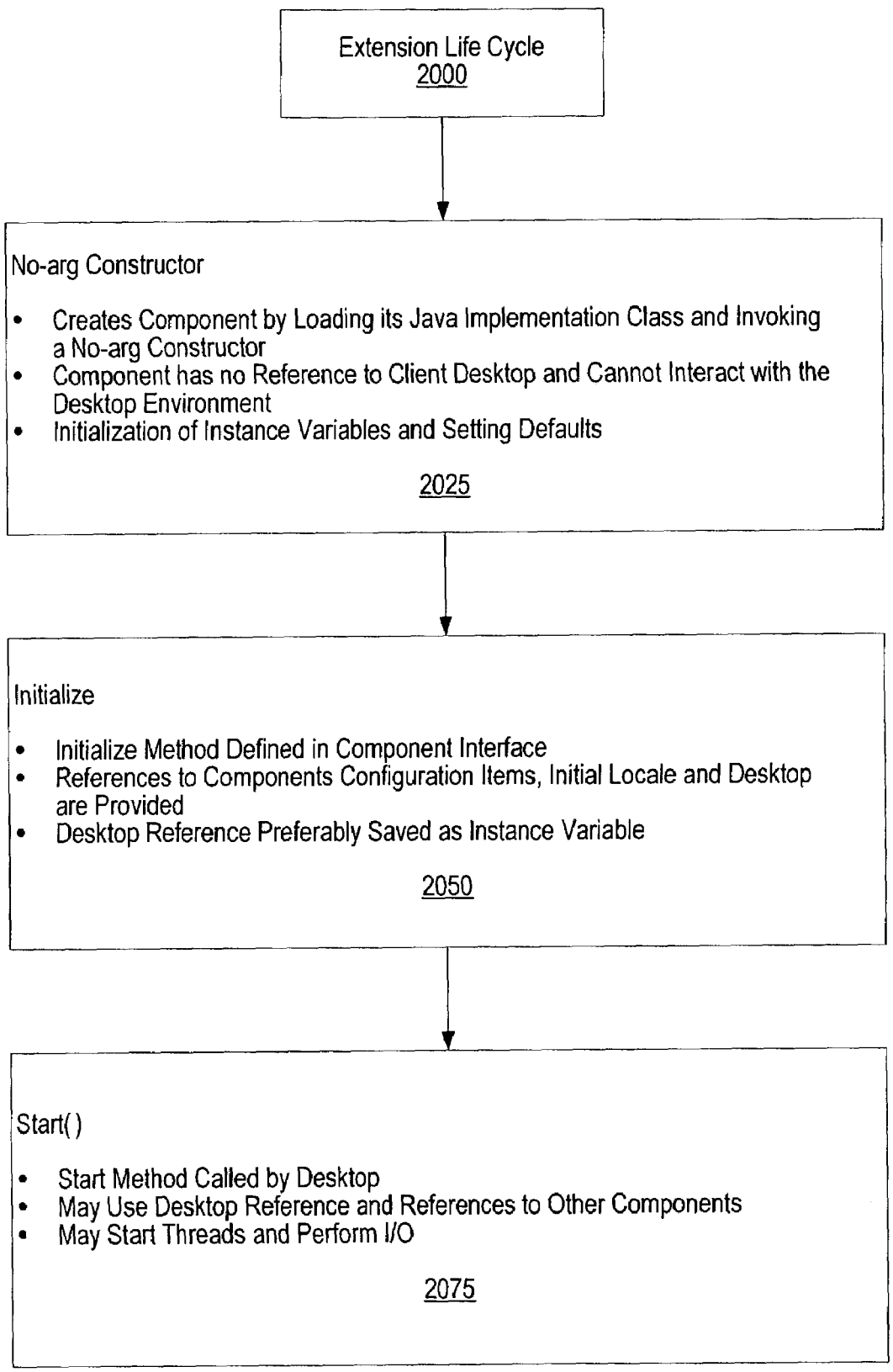
FIG. 20 is a flowchart showing an application extension lifecycle.

FIG. 20 is a flowchart showing an application extension lifecycle. The application extension lifecycle begins at step 2000. During the first phase of the application extension lifecycle, the application extension uses a no-arg constructor (step 2025). The no-arg constructor is used to create the application extension component by loading its Java implementation class and invoking a no-arg constructor. At this point, the application extension component has no reference to the client desktop and cannot interact with the desktop environment. During this phase, instance variables and default settings are initialized.

During the next phase of the application extension lifecycle, the application extension initializes (step 2050). During the initialization phase, the initialized method corresponding to the application extension is defined in the component interface. References to component configuration items, initial locale information, and desktop references are also provided. Desktop references are preferably saved as instance variables during this phase.

During the final phase of the application extension lifecycle, the start method corresponding to the application extension is invoked (step 2075). The start method is called by the desktop. For example the start method may be called when the icon corresponding to the application extension is selected by a user. During this phase, the application extension may use desktop references as well as references to other desktop components. In addition the application extension may at this time start threads and perform I/O operations.

Figure 21A:
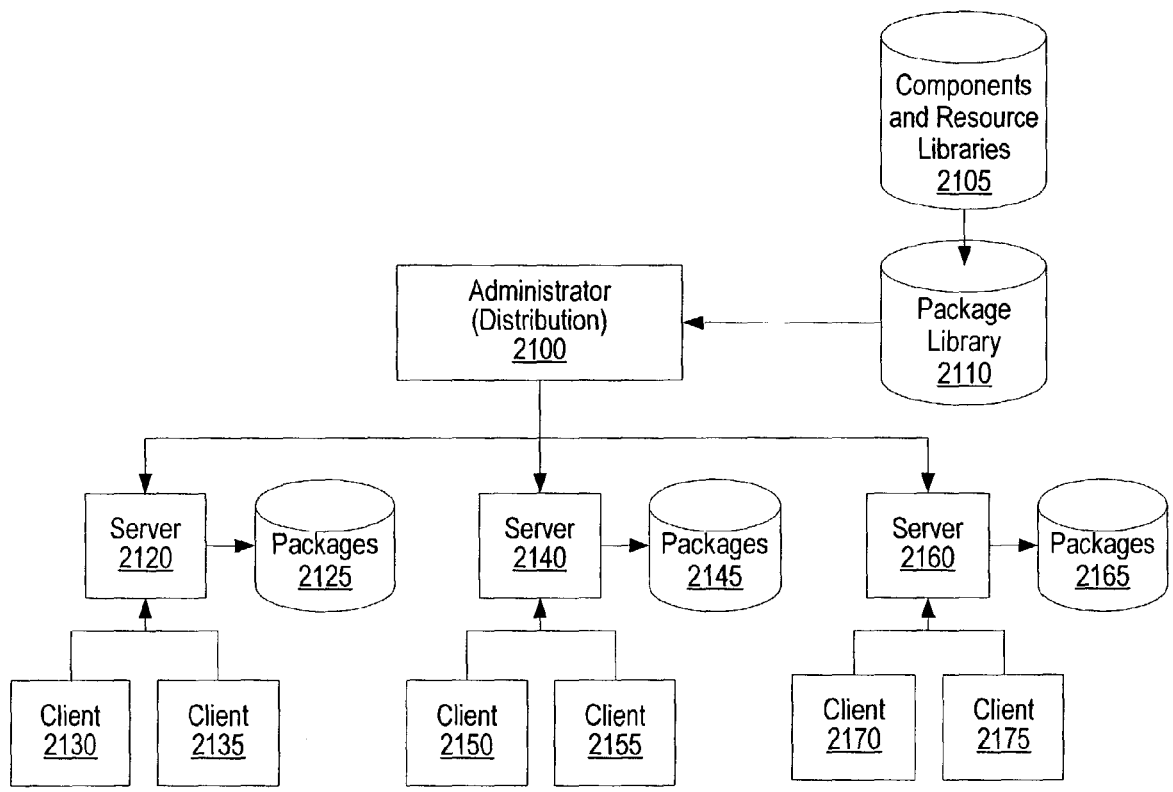
FIG. 21A is a block diagram showing components and resources being distributed from an administrator to multiple clients.

FIG. 21A is a block diagram showing components and resources being distributed from an administrator to multiple clients. Administrator 2100 publishes components and resource libraries 2105 that had been packaged into various desktop packages 2110 by transmitting these packages to various servers.

In the example shown in FIG. 21A, there are three servers that receive desktop packages from the administrator. The servers include server 2120, server 2140, and server 2160. Each of the servers includes a nonvolatile storage area for storing desktop packages receive from the administrator. Server 2120 uses nonvolatile storage area 2125 for storing desktop packages, server 2140 uses nonvolatile storage area 2145, and server 2160 uses nonvolatile storage area 2165. The desktop packages are distributed from the administrator to the servers in the process described in FIG. 17. The servers are used to provide desktop packages to various clients.

In the example shown in FIG. 21A, there are two clients that receive desktop packages from each of the servers. Clients 2130 and 2135 receive desktops from server 2120, clients 2150 and 2155 receive desktops from server 2140, and clients 2170 and 2175 receive desktops from server 2160. The desktops are distributed from the servers to clients using the process described in FIG. 18. In this manner, components and resources used in the various self-contained desktops are distributed from an administrator throughout the system to servers and eventually to clients.

Figure 21B:
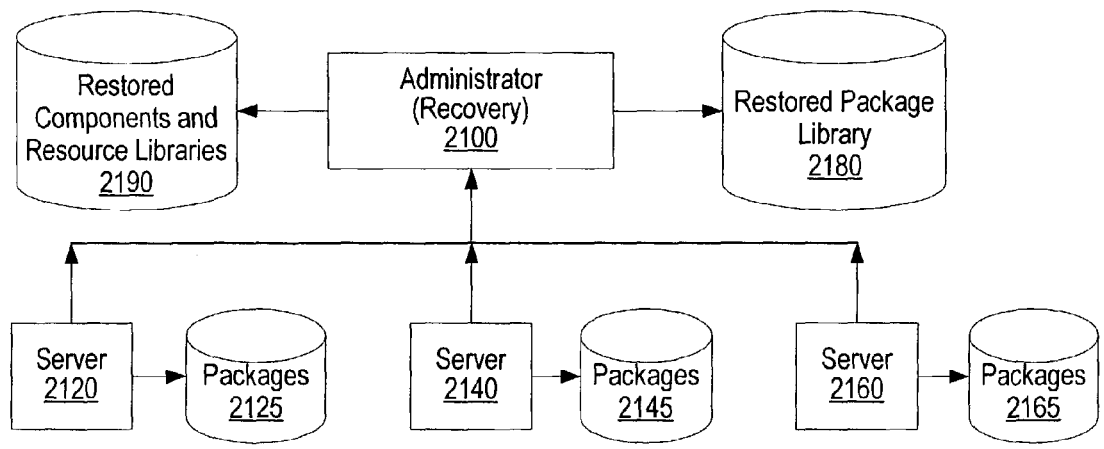
FIG. 21B is a block diagram showing components and resources being recovered by an administrator from servers following a data loss by the administrator.

FIG. 21B is a block diagram showing components and resources being recovered by an administrator from servers following a data loss by the administrator. When a disaster event, such as a computer crash, fire, or flood occurs, the administrator may be left without the components and resources used to create the various self-contained desktops. In order to recover these files, administrator 2100 requests desktop packages, including the components that comprise the desktop packages, from the various servers. Using the topography described in FIG. 21A, the administrator requests packages from servers 2120, 2140, and 2160. The servers retrieve self-contained desktop packages that include desktop components from storage areas 2125, 2145, and 2165 respectively. The desktop information is transmitted from the various servers back to the administrator. The administrator stores the received self-contained desktop packages in restored package library 2180. The components and resources that are included in the self-contained desktops are extracted from the desktop files and stored in restored components and resource libraries 2190. In this manner, the administrator is able to recover and restore the components and resources that had previously been published to the various servers. This recovery is performed without having to have the administrator make separate backup copies of the components and resources. Because components and resources include unique identifiers, multiple versions, or levels, of components and resources are also able to be recovered. A flowchart showing the steps taken by the administrator to recover desktop data is shown in FIG. 22.

Figure 22:
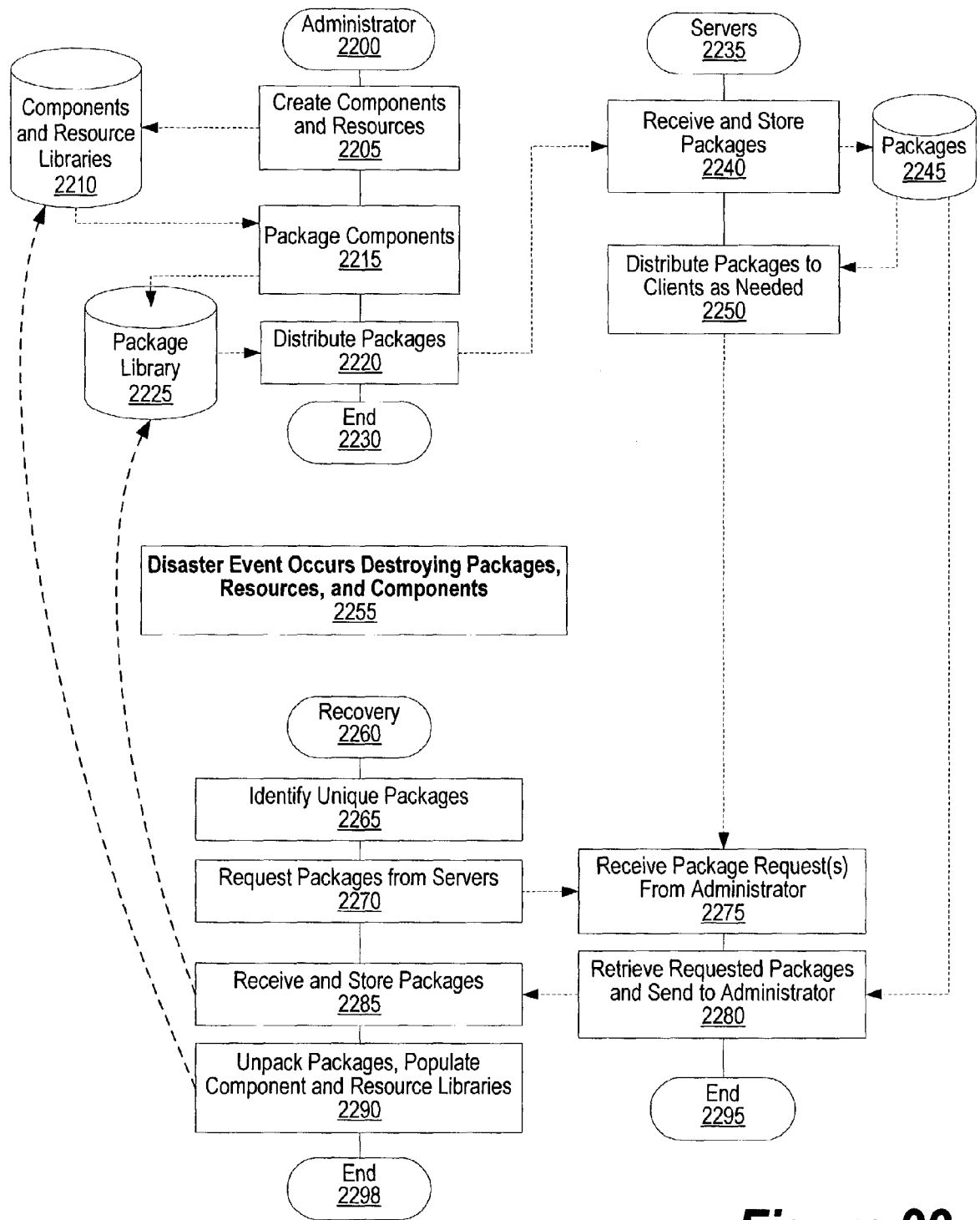
FIG. 22 is a flowchart showing steps taken by an administrator in distributing self-contained desktops and subsequently recovering self-contained desktops from servers following a disaster event.

FIG. 22 is a flowchart showing steps taken by an administrator in distributing self-contained desktops and subsequently recovering self-contained desktops following a disaster event. Administrator processing commences at 2200 whereupon the administrator creates components and resources (step 2205) that will be used in self-contained desktops. These components and resources are stored in a library that is stored in nonvolatile storage area 2210.

The components and resources are packaged (step 2215) into various self-contained desktops for use by various users based upon the users' roles. The self-contained desktops are stored in self-contained desktop library 2225. The self-contained desktops are distributed (step 2220) to various servers. Administrator distribution processing ends at 2230. Further detail regarding the distribution of self-contained desktops can be found in FIG. 17.

Server reception of self-contained desktops commences at 2235 whereupon the server receives the self-contained desktop packages (step 2240) and stores the received packages in nonvolatile storage area 2245. The server then distributes self-contained desktops to clients has needed (step 2250). Further detail regarding the distribution of self-contained desktops to clients can be found in FIG. 18.

At some point, a disaster event occurs destroying packages, resources, and components from the computer system and storage devices use by the administrator (step 2255). The self-contained desktop information is then recovered by the administrator using the recovery process commencing at step 2260. The administrator identifies unique packages that have been destroyed and are no longer stored on the administrator's computer system (step 2265). The identified packages are requested from the various servers (step 2270).

The servers receive desktop package requests from the administrator (step 2275). The requested desktop packages are retrieve from the server's nonvolatile storage area 2245 and transmitted to the administrator's computer system (step 2280) and server recovery processing ends at 2295.

The administrator computer systems receives the self-contained desktop packages sent by the servers and stores the received desktop packages in package library 2225 (step 2285). The self-contained desktop packages are unpacked and the components and resources that are included in self-contained desktop packages are used to repopulate components and resource libraries 2210 (step 2290). At this point, all packages, components, and resources that were previously distributed by the administrator have been recovered and stored in the appropriate libraries. Administrator recovery processing then ends at 2298.

Figure 23:
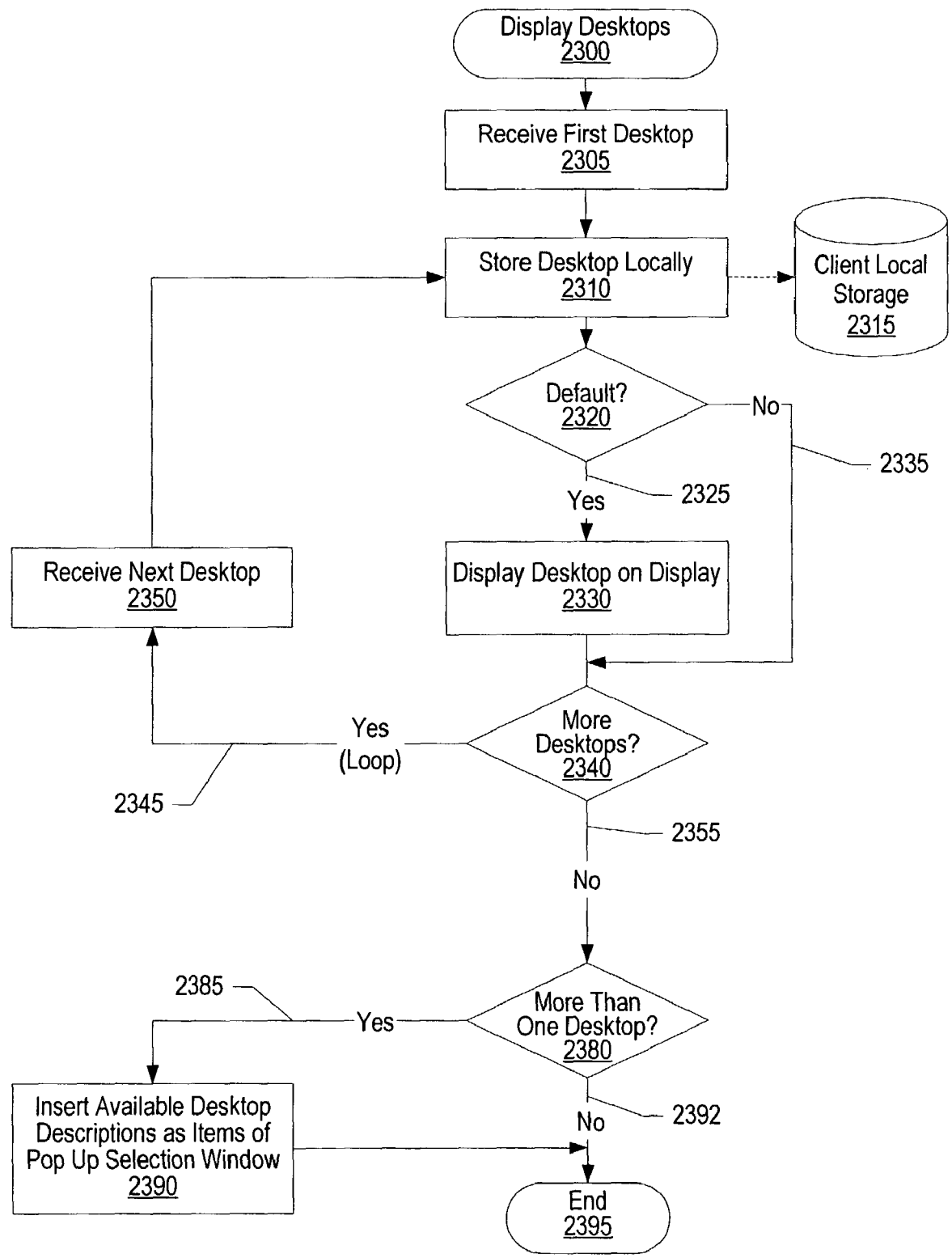
FIG. 23 is a flowchart showing steps taken by a client to receive and display desktops.

FIG. 23 is a flowchart showing steps taken by a client to receive and display desktops based upon the client's role (or roles) in the organization. Processing commences at 2300 whereupon the client machine receives the first desktop from server (step 2305). The received desktop is stored on client's local storage 2315, either in a volatile or a nonvolatile storage area (step 2310).

A determination is made as to whether the received desktop is the default desktop for the client (decision 2320). If the receive desktop is the default desktop, decision 2320 branches to "yes" branch 2325 whereupon the received desktop is displayed on the client's display device (step 2330). On the other hand, if the received desktop is not the default desktop, decision 2320 branches to "no" branch 2335 bypassing step 2330.

A determination is made as to whether there are more desktops for the client machine to receive from the server (decision 2340). If there are more desktops to receive, decision 2340 branches to "yes" branch 2345 whereupon processing loops back to receive the next desktop (step 2350) and determine whether the next desktop is the default desktop. This looping continues until all needed desktops have been received from the server, at which point decision 2340 branches to "no" branch 2355.

A determination is made as to whether more than one desktop is accessible by the client (decision 2380). If more than one desktop is accessible, decision 2380 branches to "yes" branch 2385 whereupon the available desktop descriptions are inserted as items within a pop-up selection window that is accessible by the client (step 2390). For example, the user could "right" click in the desktop area using appointing device, such as a mouse, which would cause the pop-up menu to be displayed. The user could then select the desired desktop from the list provided in the pop-up menu (see FIG. 27 for an example desktop screen and pop-up menu). For example, if a branch manager also has an assigned role of a loan officer, the branch manager can select the loan officer desktop from the pop-up menu. After selecting the loan officer desktop, the desktop components used for loan officer functions would be displayed and be accessible from the desktop area. On the other hand, if there are no more than one desktop accessible by the client, decision 2380 branches to "no" branch 2392 bypassing step 2390. Display desktop processing then ends at 2395.

Figure 24:
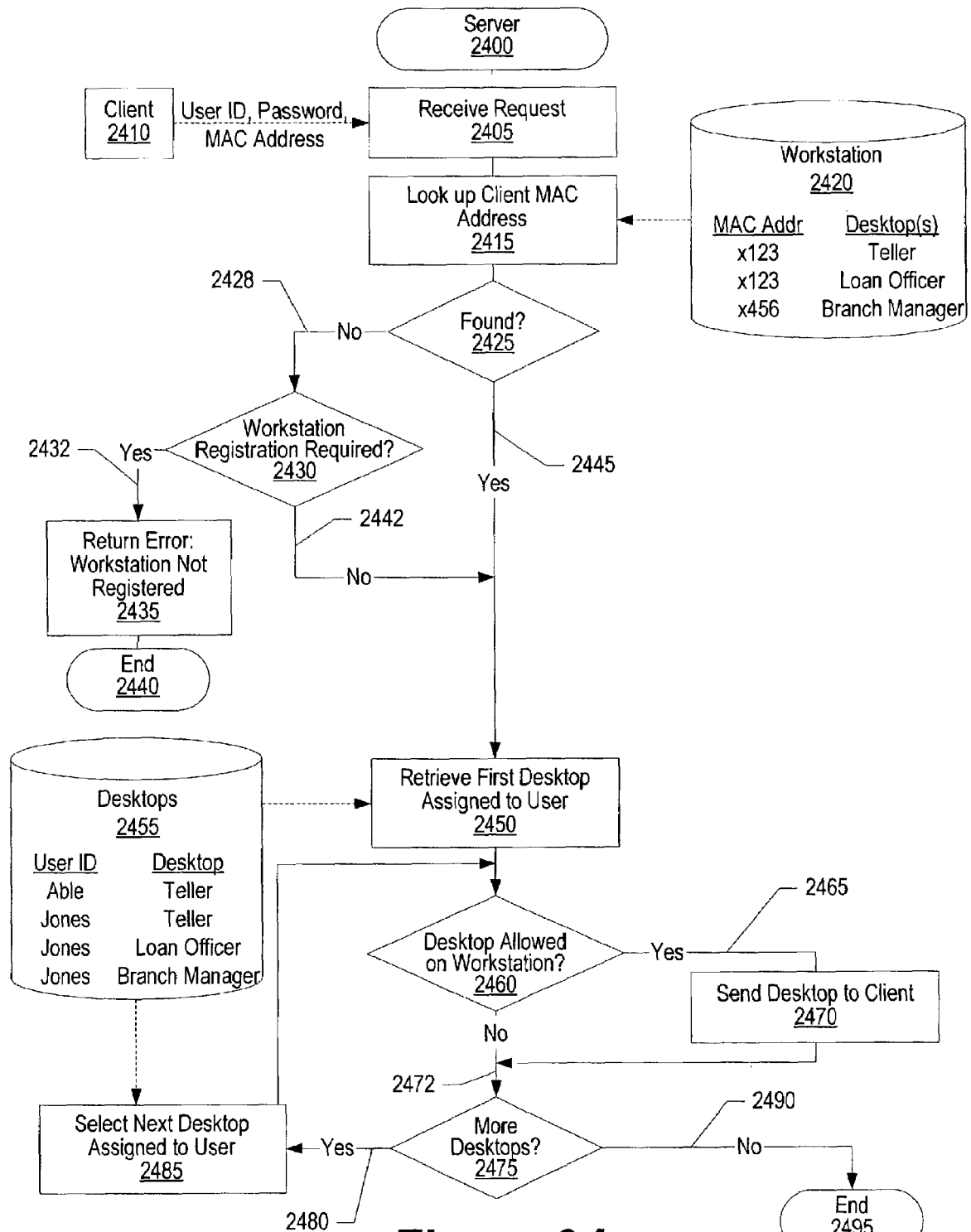
FIG. 24 is a flowchart showing steps taken by a server to provide desktop information to a client based on the user's role and the workstation's role.

FIG. 24 is a flowchart showing steps taken by a server to provide desktop information to a client based on the user's role and the workstation's role. Processing commences at 2400 whereupon the server receives a desktop request (step 2405) from client 2410. The request includes the client's user ID, password, and the client workstation's MAC address.

The server looks up the client's MAC address (step 2415) from workstation table 2420 that includes the roles that are allowed to be performed on various workstations. In the example shown, the workstation with a MAC address of "123" is allowed to perform both teller and loan officer functions, while the workstation with a MAC address of "456" is only allowed to perform branch manager functions.

A determination is made as to whether the client's MAC address was found in the workstation table (decision 2425). If the MAC address was not found, decision 2425 branches to "no" branch 2428 whereupon a determination is made as to whether client workstation registration is required by the system (decision 2430). If workstation registration is required, decision 2430 branches to "yes" branch 2430 whereupon an error is returned to the client (step 2435) indicating that the client's workstation is not registered and server processing ends at 2440. On the other hand, if workstation registration is not required decision 2430 branches to "no" branch 2442 and processing continues. Returning to decision 2425, if the client's MAC address was found in the workstation table, decision 2425 branches to "yes" branch 2445 and processing continues.

The first desktop that has been assigned to the user's identifier (user ID) is retrieved (step 2450) from user desktop table 2455. In the example shown, the user ID "Able" has been assigned to the "teller" role, while the user ID "Jones" has been assigned to the "teller," "loan officer," and "branch manager" roles. A determination is made as to whether the retrieved desktop assigned to the user is allowed to be used on the workstation that is being used by the user (decision 2460). If the desktop is allowed to be used to the workstation, decision 2460 branches to "yes" branch 2465 whereupon the desktop is sent to the client (step 2470). On the other hand, if the retrieved desktop is not allowed to be used on the workstation, decision 2460 branches to "no" branch 2472 bypassing step 2470.

A determination is made as to whether there are more roles, or desktops, that have been assigned to the user (decision 2475). If there are more roles that have been assigned to the user, decision 2475 branches to "yes" branch 2480 whereupon the next desktop assigned to the user is selected (step 2485) and processing loops back to determine whether the next desktop should be set to client. This looping continues until all desktops assigned to the user have been processed, at which point decision 2475 branches to "no" branch 2490 and server processing ends at 2495.

Figure 25:
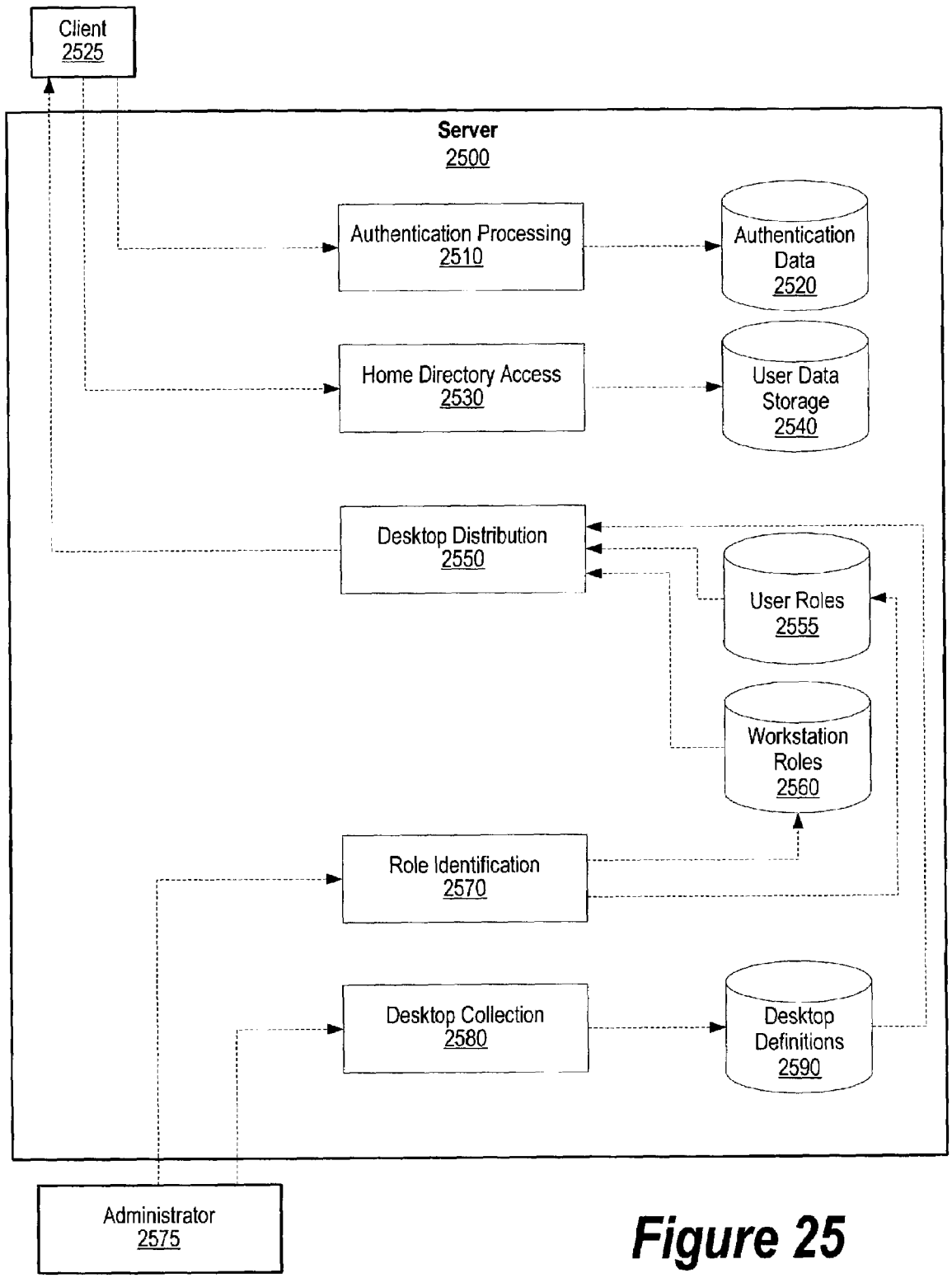
FIG. 25 is a block diagram showing processing performed by a server and interaction between the server, clients, and administrator.

FIG. 25 is a block diagram showing processing performed by a server and interaction between the server, clients, and administrator. Server 2500 performs role identification function 2570 by receiving role assignments from administrator 2575. Role assignments included roles that have been assigned to the user as well as roles that have been assigned to workstations located throughout the network. Workstation roles are stored in workstation role data store 2560. The user roles are stored in user role data store 2555.

Server 2500 also performs desktop collection processing 2580 by receiving desktop information from administrator 2575. The desktop information is stored in desktop definition data store 2590. The desktop information includes self-contained desktops that, in turn, included desktop components and resources for use by client 2525.

Server 2500 receives authentication information from client 2525, such as a user ID and password, which is used to authenticate the client. Server 2500 performs authentication processing 2510 by checking the client's authentication information with authentication data that is located in authentication data store 2520. Once the client has been authenticated, the client receives access to client's data storage area 2540 which is stored on server 2500. The server provides access to the client's data storage by performing home directory access process 2530. In this manner, a user can access his or her data regardless of which workstation he or she is using.

Server 2500 performs desktop distribution process 2550 to determine which self-contained desktops to send to client 2525. Desktop distribution process 2550 is performed by comparing user roles stored in user role data store 2555 with workstation roles stored in workstation role data store 2560. Desktops, or roles, that are assigned to both the user and the workstation are distributed to the client. Server 2500 retrieves the desktop information from desktop data store 2590 and transmits the desktop information to client 2525.

Figure 26:
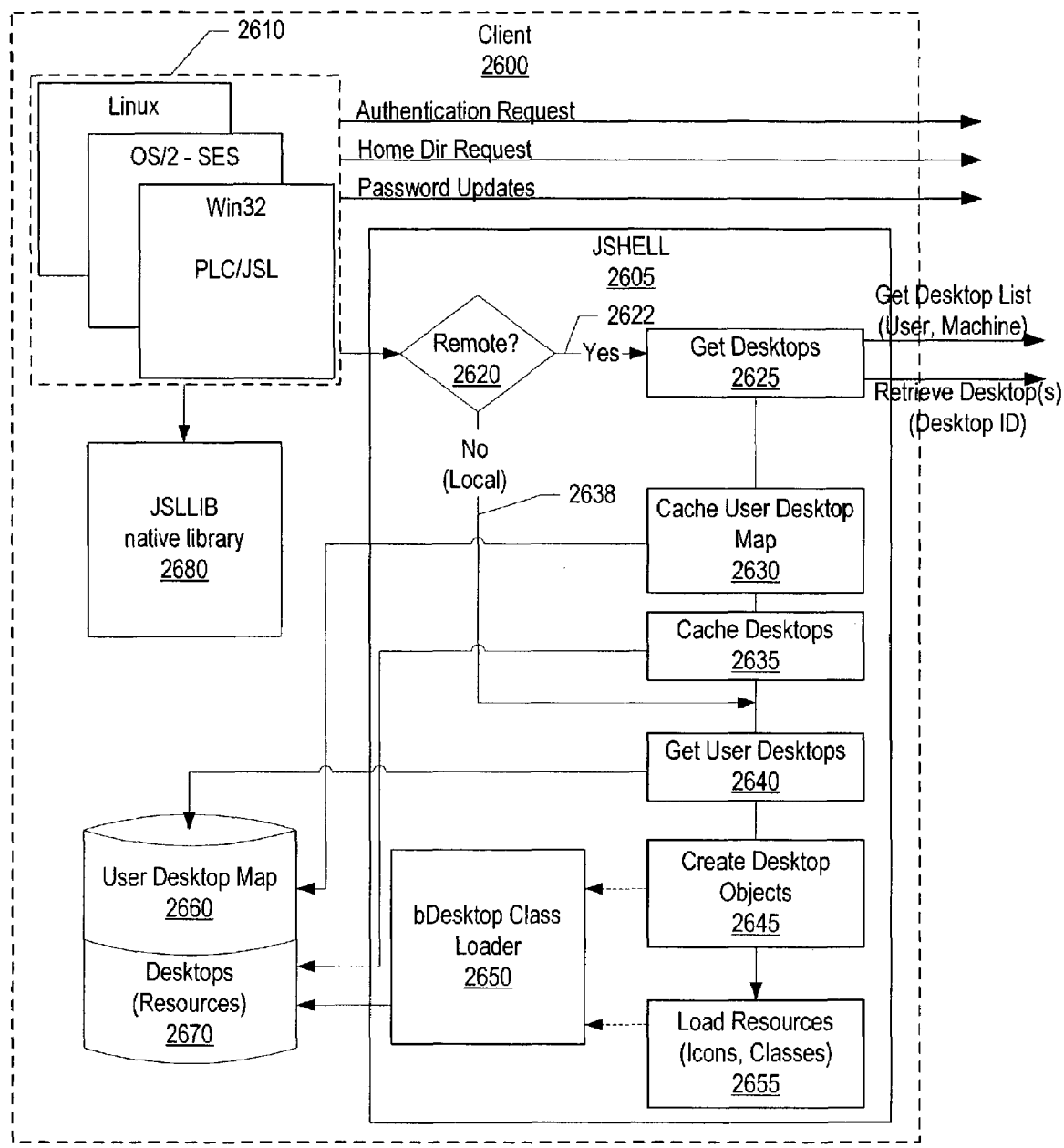
FIG. 26 is a flowchart showing steps taken by a client in initializing and displaying self-contained desktops.

FIG. 26 is a flowchart showing steps taken by a client in initializing and displaying self-contained desktops. Client 2600 performs authentication request, home directory request, and password updates by sending the corresponding information to the server. Client 2600 uses an underlying operating system platform 2610 to perform native operations. JSLLIB 2680 is a native library that includes native commands and programs used to perform native operations.

Shell 2605 is a Java-based application that is adapted to run on any of the operating system platforms used in the system (e.g., Windows XP™, OS/2™, or Linux™). The shell makes a determination as to whether the client login is performed remotely through a server or locally (decision 2620). If the login is performed remotely, decision 2620 branches to "yes" branch 2622 whereupon the client receives desktops from the server (step 2625). In one embodiment, the desktops are received by first receiving a list of desktops and then retrieving individual desktops from the list.

The list, or map, of desktops is cached to local storage located on the client machine (step 2630). The received desktops are also cached to local storage (step 2635). Returning to decision 2620, if the desktops are not retrieved remotely, decision 2620 branches to "no" branch 2638 bypassing steps 2625, 2630, and 2635.

The desktops that have been assigned to both the user and the workstation are retrieved from local storage (step 2640). Local storage is used to store user desktop map 2660 and desktops 2670. Desktops are self-contained packages that include desktop components and resources needed to display and execute the desktop. The retrieved desktop information is used to create desktop objects (step 2645). Desktop class loader 2650 is used to create the desktop objects. Resources, such as national language translations, are loaded from the desktop information (step 2655). Desktop class loader 2650 is also used to load the needed resources.

At this point, the desktops assigned to the user in workstation have been retrieved and made available to the user within shell 2605. Desktop objects and resources have been extracted from the self-contained desktops and have been made available to the user through shell 2605.

Figure 27:
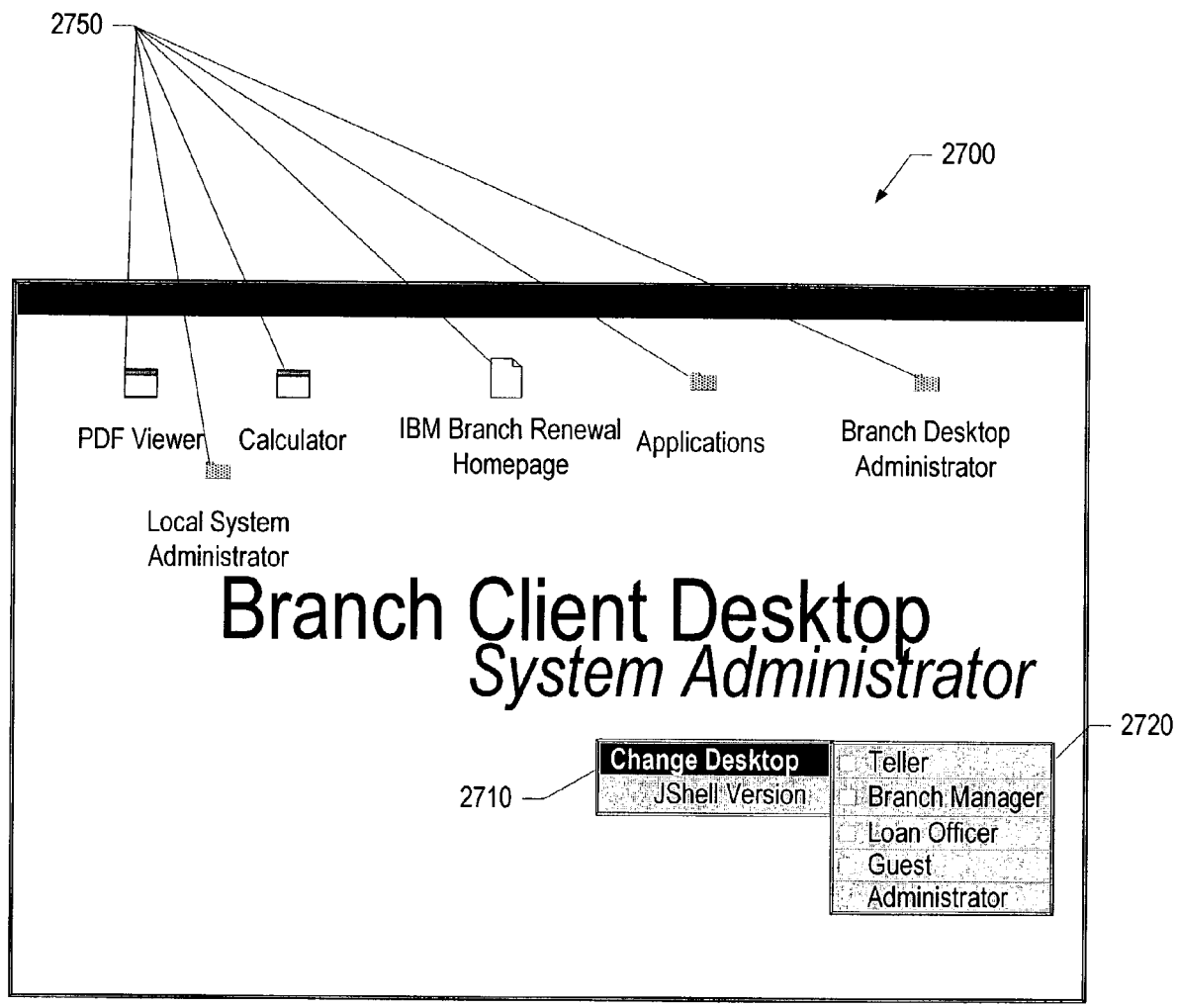
FIG. 27 is a screen layout of a sample desktop displayed on a client workstation along with a pop-up menu of other self-contained desktops available to the client.

FIG. 27 is a screen layout of a sample desktop displayed on a client workstation along with a pop-up menu of other self-contained desktops available to the client. Desktop screen layout 2700 includes a number of objects 2750. Objects 2750 include desktop components that are accessible from the desktop. Each desktop component corresponds to a graphical image, such as an icon, which is selectable by the user using a pointing device such as a mouse.

Pop-up menu 2710 includes two items allowing the user to either change the desktop or display the shell version. Selecting the "Change Desktop" item causes the display of desktop selection menu 2720. The user selects the desktop that is desired by placing a check mark in the box beside the desired desktop. In the example shown, the "administrator" desktop is being displayed on the client display as evidenced by the check mark shown in desktop selection menu 2720.

If the user wishes to change the desktop, for example to the branch manager desktop, the user simply uses a pointing device, such as a mouse, and places a check mark in the box next to the "branch manager" menu item.

Components 2750 may change depending upon the desktop that has been selected. For example, the "Branch Desktop Administrator" desktop component is displayed because the "Administrator" desktop has been selected. However, if another desktop, such as the "Teller" desktop, is selected, the "Branch Desktop Administrator" will no longer appear and will not be accessible from the display. In this manner, components for a selected role are displayed and accessible, while components used by a different role are not displayed and are not accessible. Moreover, components that are used by multiple roles are each available from the various desktops that correspond to the roles.

Figure 28A:
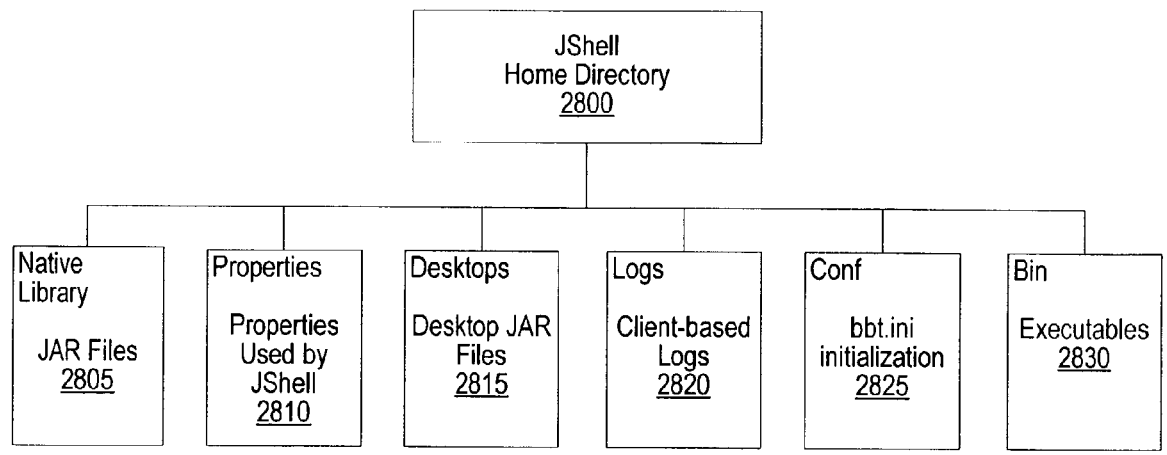
FIG. 28A is a hierarchy chart of directories used by the client shell in displaying and managing desktops.

FIG. 28A is a hierarchy chart of directories used by the client shell in displaying and managing desktops. Shell home directory 2800 includes a number of subdirectories used by the client for performing desktop functions. In one embodiment, the shell home directory and its subdirectories are stored on a server accessible by the client. In another embodiment, the shell home directory and its subdirectories are stored on a nonvolatile storage device local to the client machine. Native library 2805 is a subdirectory used to store programs used to interface with the client's operating system platform. In one embodiment, native library information is stored in Java archive (JAR) files. Properties subdirectory 2810 is a subdirectory used to store properties that are used by the shell program. These properties can include display attributes and other configuration items used by the shell program.

Desktop subdirectory 2815 is the directory in which self-contained desktop files are stored. In one embodiment, self-contained desktop files are packaged into Java archive (JAR) files. In this manner, all components and resources used by particular desktop are packaged and included in a self-contained desktop JAR file. Log subdirectory 2820 is used to store client-based logs that detail the actions taken by the client. "Conf" subdirectory 2825 is used to store initialization information used by the shell application. "Bin" subdirectory 2830 is used to store executables, such as program files, that are used to launch the shell application.

Figure 28B:
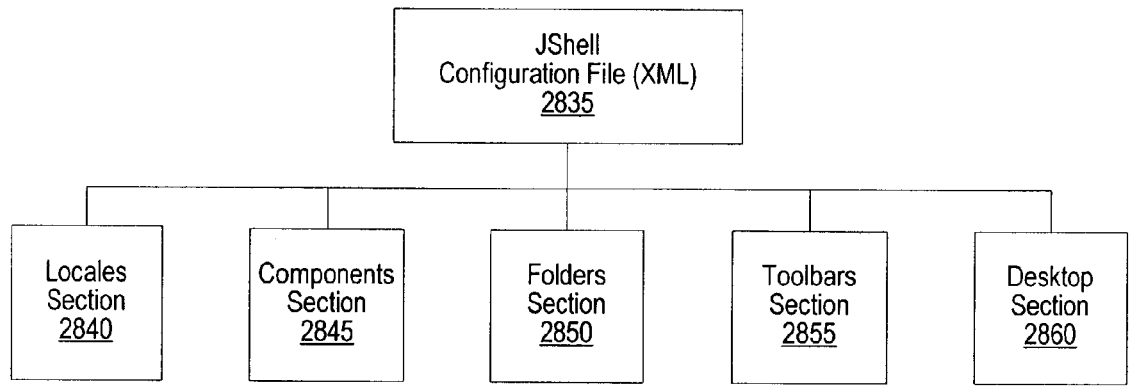
FIG. 28B is a hierarchy chart of sections included with the shell configuration file.

FIG. 28B is a hierarchy chart of sections included with the shell configuration file. The shell configuration file includes number of sections. Each of these sections includes information about a particular aspect of the shell. In one embodiment, the shell configuration file is an XML file that includes a number of sections. The sections include locales section 2840 that includes information about the locale, such as national language translations, used by the shell application. Component section 2845 includes information about the components that are included with the self-contained desktop. Components include applications and other programs that are accessible from the desktop when the user selects an appropriate icon or other command. Folders section 2850 includes information about the various folders that are accessible from the desktop. Toolbars section 2855 includes information about the various toolbars that are displayed and accessible from the desktop. Desktop section 2860 includes information about the desktop, such as appearance data and policy information.

Figure 28C:
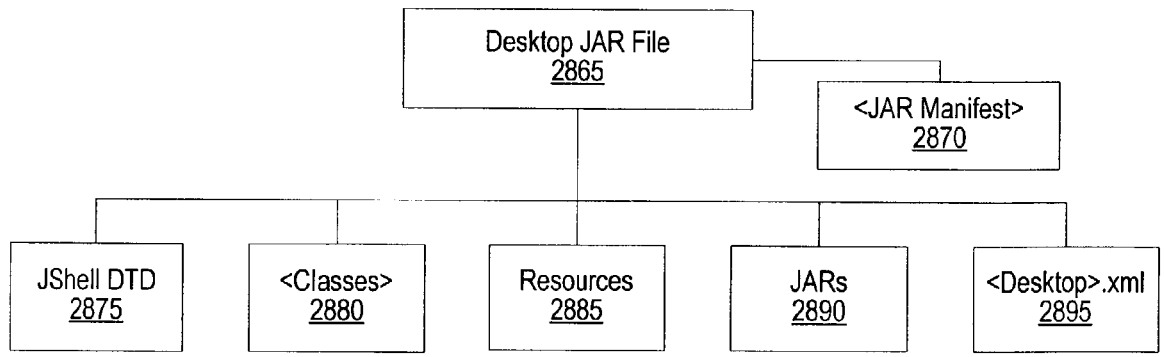
FIG. 28C is a hierarchy chart of objects included in the self-contained desktop file.

FIG. 28C is a hierarchy chart of objects included in the self-contained desktop file. In one embodiment, the self-contained desktop is a Java archive (JAR) file. Self-contained desktop file 2865 includes number of components. The components include manifest 2870 which details the objects included in the self-contained desktop file. The components also include a Shell Document Type Definition (DTD) object 2875. The Shell DTD object states what kinds of attributes are used to describe content in the Shell XML document, where each tag is allowed, and which tags can appear within other tags. Classes objects 2880 include the Java classes that are used by the desktop. Resources 2885 include resource information, such as national language translation information, that is used by the desktop. JAR objects 2890 include additional objects needed by the desktop that are packaged into further JAR files. XML object 2895 includes the XML document that is used to describe the self-contained desktop.

Figure 29:
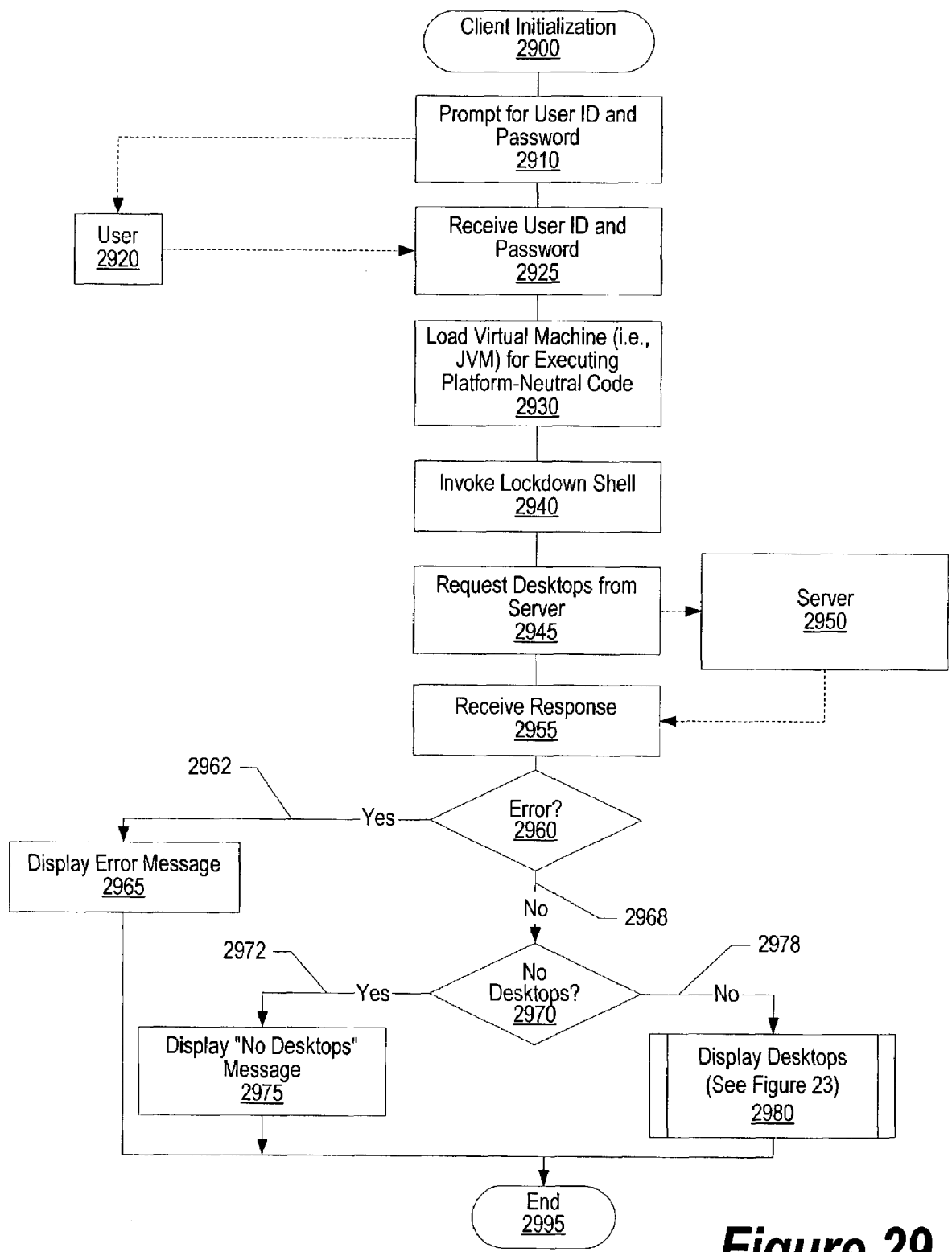
FIG. 29 is a flowchart showing steps taken to initialize the client to use self-contained desktops.

FIG. 29 is a flowchart showing steps taken to initialize the client's workstation to use self-contained desktops. Processing commences at 2900 whereupon user 2920 is prompted for a user ID and password (step 2910). The user ID and password are received from the user (step 2925). When authenticated, the virtual machine, such as a Java virtual machine (JVM), is loaded on the client operating system platform (step 2930) by JSL. The virtual machine is designed to execute platform-neutral code, such as Java applications. In this manner, the same desktops can be written in a platform independent language, such as Java, and executed on a variety of platforms that have implemented the needed virtual machine.

A Java-based lockdown shell is invoked (step 2940) to provide a desktop environment and prevent the user from accessing the underlying operating system being used by the client machine. Desktops that are assigned to both the workstation and the user are requested from a server (step 2945). Server 2950 receives requests and responds by sending self-contained desktops to the client. The client receives a response from the server (step 2955). The response may be an error or a list of desktops.

A determination is made as to whether an error was received from the server (decision 2960). If an error was received, decision 2960 branches to "yes" branch 2962 whereupon an error message is displayed on the client's display device (step 2965) and processing ends at 2995. On the other hand, if an error was not receive, decision 2960 branches to "no" branch 2968 whereupon a determination is made as to whether there are any desktops to display on the client's display device (decision 2970). If there are no desktops display on the client's display device, decision 2970 branches to "yes" branch 2972, the user is informed that there are no desktops to displayed (step 2975), and processing ends at 2995. On the other hand, if there are desktops assigned to the user and the workstation, decision 2970 branches to "no" branch 2978 whereupon the desktops are displayed on the client's display device (predefined process 2980) and processing ends at 2995.

Figure 30:
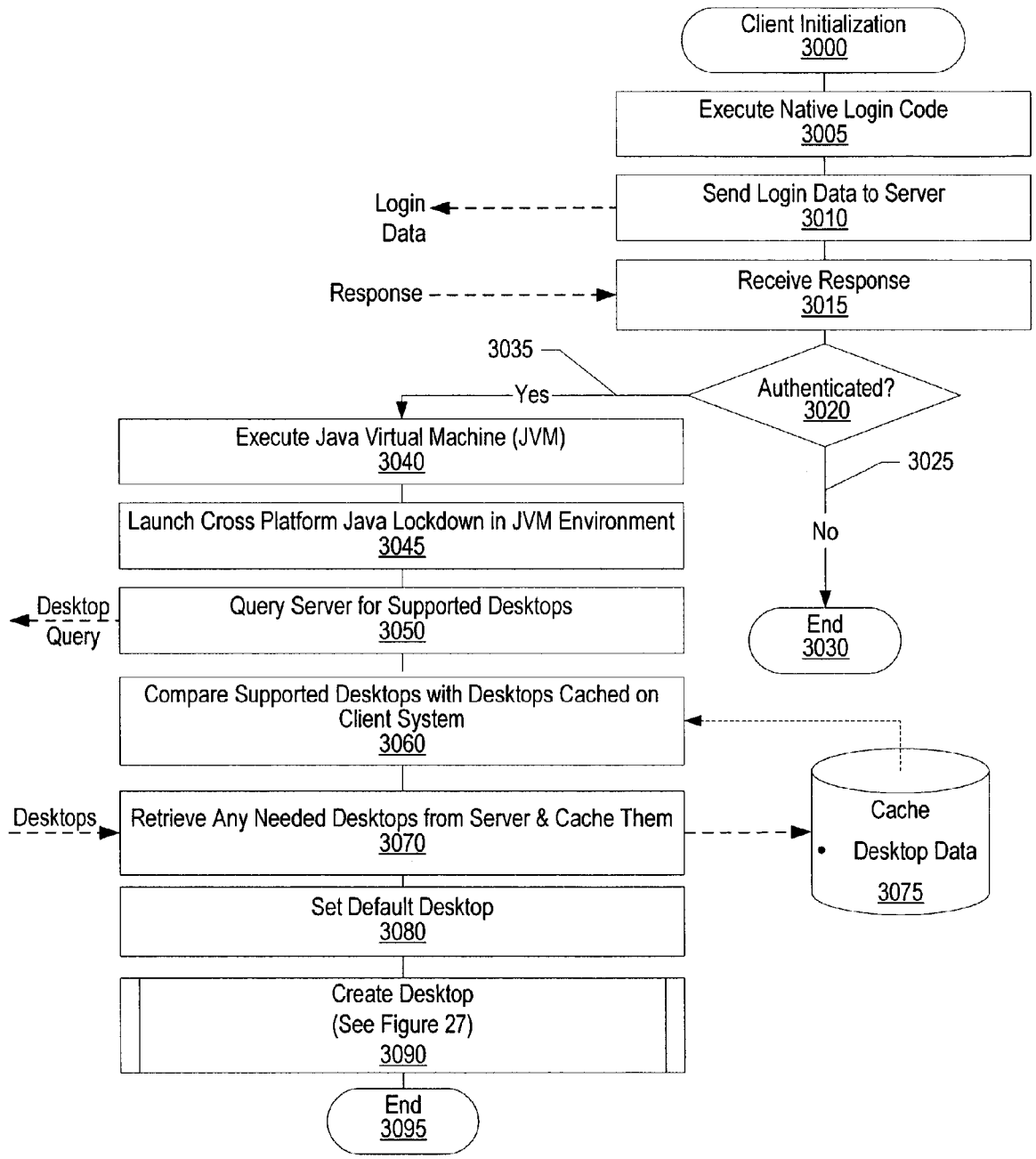
FIG. 30 is a flowchart showing steps taken during client initialization.

FIG. 30 is a flowchart showing steps taken during client initialization. Processing commences at 3000 whereupon native login code is executed (step 3005). Login data is gathered from the user and sent to the server for processing (step 3010). The server sends a response back to the client which is received at step 3015.

A determination is made as to whether the user was authenticated (decision 3020). If the user was not authenticated, decision 3020 branches to "no" branch 3025 whereupon processing ends at 3030. On the other hand, if the user was authenticated, decision 3020 branches to "yes" branch 3035 to continue initialization.

The virtual machine application, such as a Java virtual machine, is invoked on the client workstation (step 3040). A lockdown process is launched in the Java environment in order to lock the shell and prevent the user from using the underlying operating system without using the shell environment (step 3045). The server is queried for the desktops have been assigned to the user/workstation (step 3050). The client receives a list of available desktops and compares the listed desktop information with desktop data that has already been cached on the client workstation (step 3060). Desktops that are included in list but not yet cached on the client workstation are retrieve from the server and cached on the client workstation (step 3070). The received desktops are stored in client accessible cache 3075. An initial, or default, desktop is selected from the list of available desktops (step 3080). The components that comprise the default desktop are then displayed on the client display device with other available desktops made available to the user through a pop-up window (predefined process 3090, see FIG. 27 for example of a desktop display and FIG. 9 for a flowchart showing details of creating desktops). Client initialization processing then ends at 3095.

Figure 31:
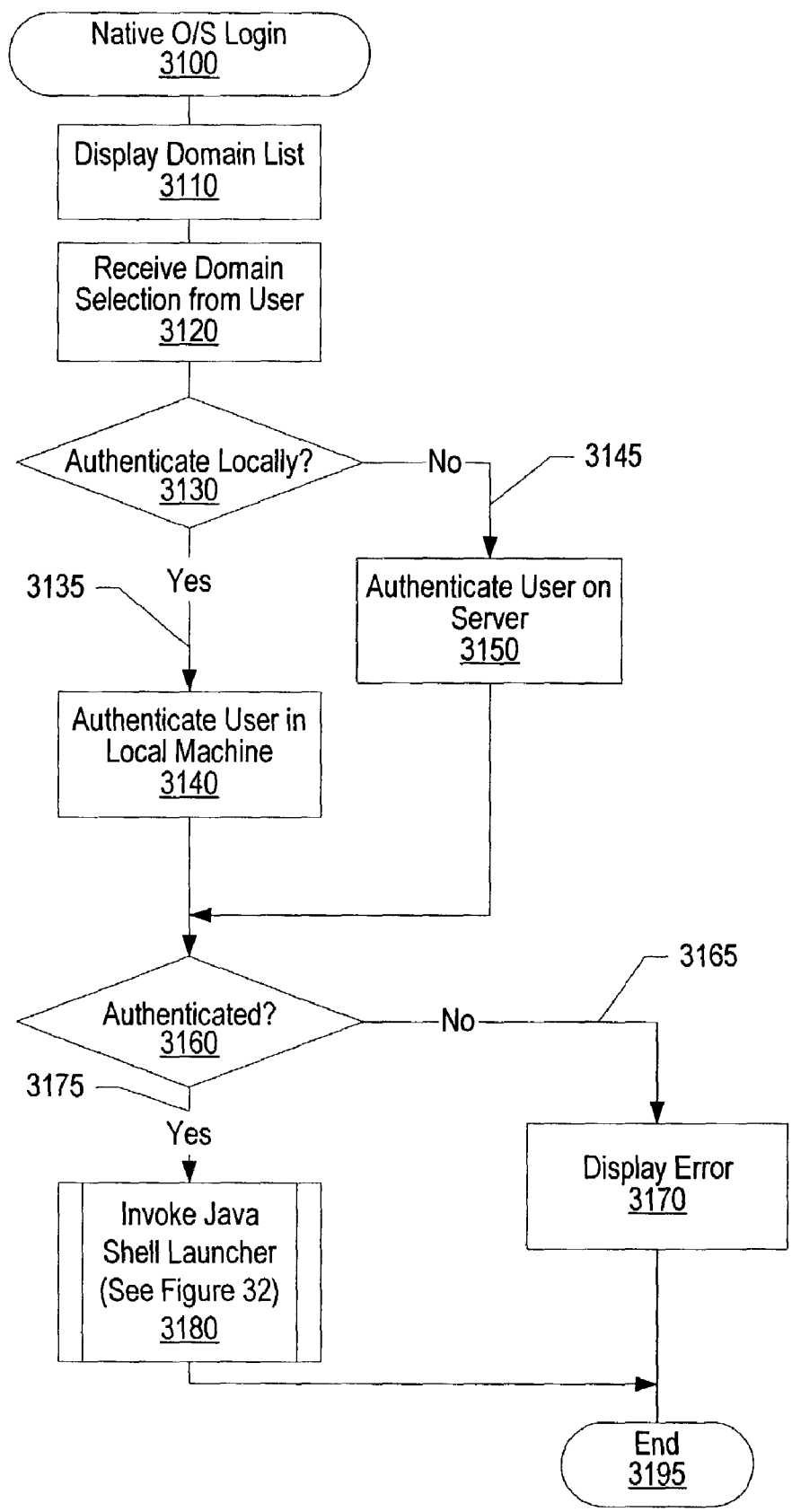
FIG. 31 is a flowchart showing steps taken during native operating system login.

FIG. 31 is a flowchart showing steps taken during native operating system login. Native operating system login processing commences at 3100 whereupon a list of available network domains is displayed to the user (step 3110). A domain is selected from the list by the user (step 3120). A determination is made as to whether to authenticate the client locally or remotely (decision 3130). If the client is authenticated locally, decision 3130 branches to "yes" branch 3135 whereupon the user is authenticated at the local machine (step 3140). On the other hand, if the user is not authenticated locally, decision 3130 branches to "no" branch 3145 whereupon the user is authenticated on a server to which the client is connected (step 3150).

A determination is made as to whether the client was authenticated (decision 3160). If the user was not authenticated, decision 3160 branches to "no" branch 3165 whereupon an error is displayed on the client's display device (step 3170) and processing ends at 3195. On the other hand, if the user was authenticated, decision 3160 branches to "yes" branch 3175 whereupon the Java shell launcher is invoked (predefined process 3180, see FIG. 32 for processing details) and processing ends at 3195.

Figure 32:
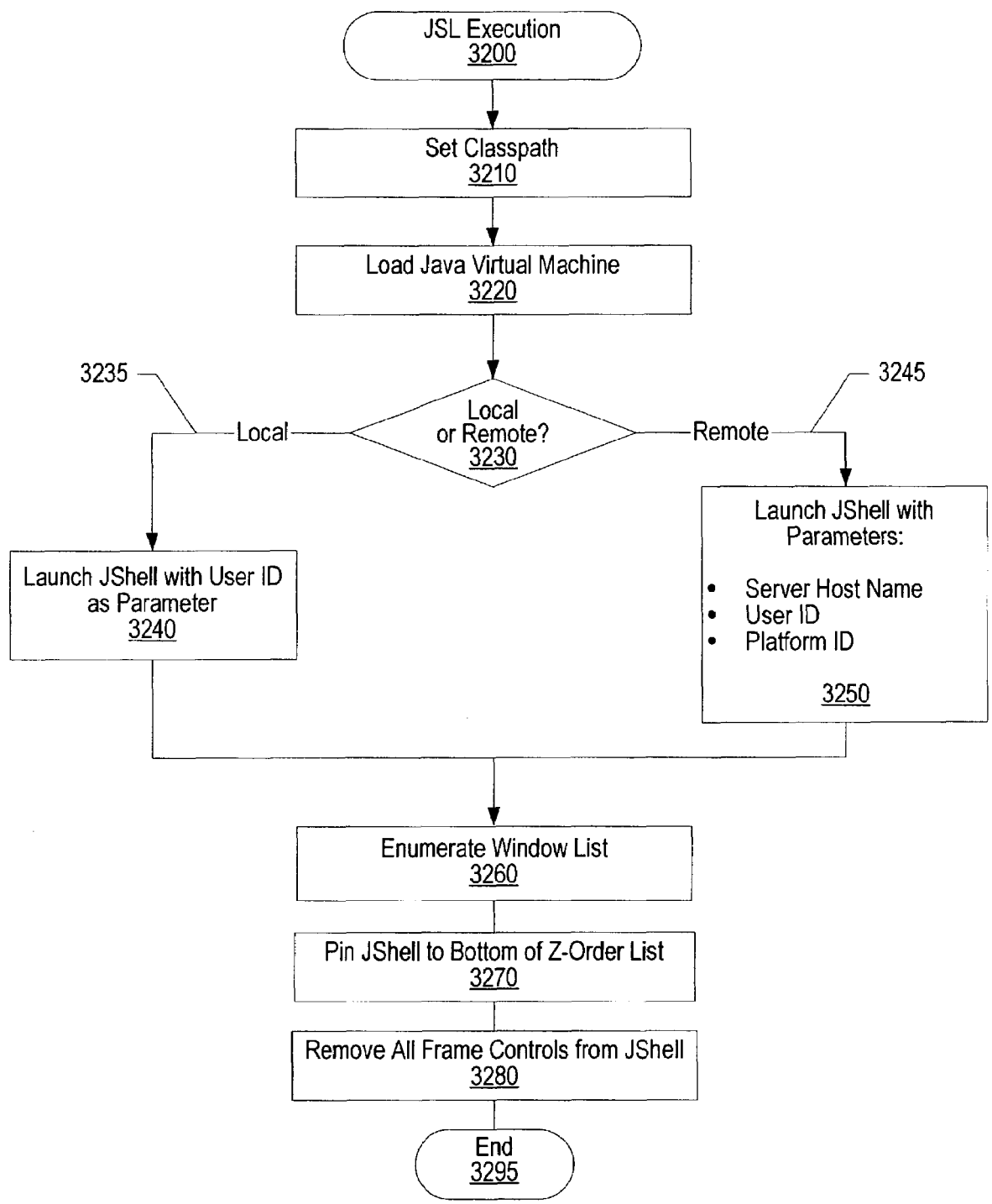
FIG. 32 is a flowchart showing steps taken when invoking the Java shell launcher.

FIG. 32 is a flowchart showing steps taken when invoking the Java shell launcher. Java Shell Launcher execution commences at 3200 whereupon a class path, or directory, is set (step 3210). The Java virtual machine (JVM) is loaded on the client computing device (step 3220).

A determination is made as to whether the Jshell application is launched remotely or locally (decision 3230). If the Jshell application is launched locally, decision 3230 branches to "local" branch 3235 whereupon the Jshell application is launched with the user's user ID as a parameter (step 3240). On the other hand, if the Jshell application is launched remotely, decision 3230 branches to "remote" branch 3245 whereupon the Jshell application is launched remotely by providing the server hostname, the user ID, and the platform ID as parameters (step 3250).

After the Jshell application has been launched, JSL enumerates the OS window list to find the window corresponding to the Java shell (step 3260). The Java shell window is pinned to the bottom of the Z-order list of the operating system windows so that the Java shell window will always remain in the foreground (step 3270). The Java shell window is maximized to fit the display screen and all frame controls, such as minimize and resize buttons, are removed from the Java shell window (step 3280). In this manner, the shell application appears as the foreground page on the display and the user is prevented from using the shell page provided by the native operating system platform. Java shell launching processing ends at 3295.

Figure 33A:
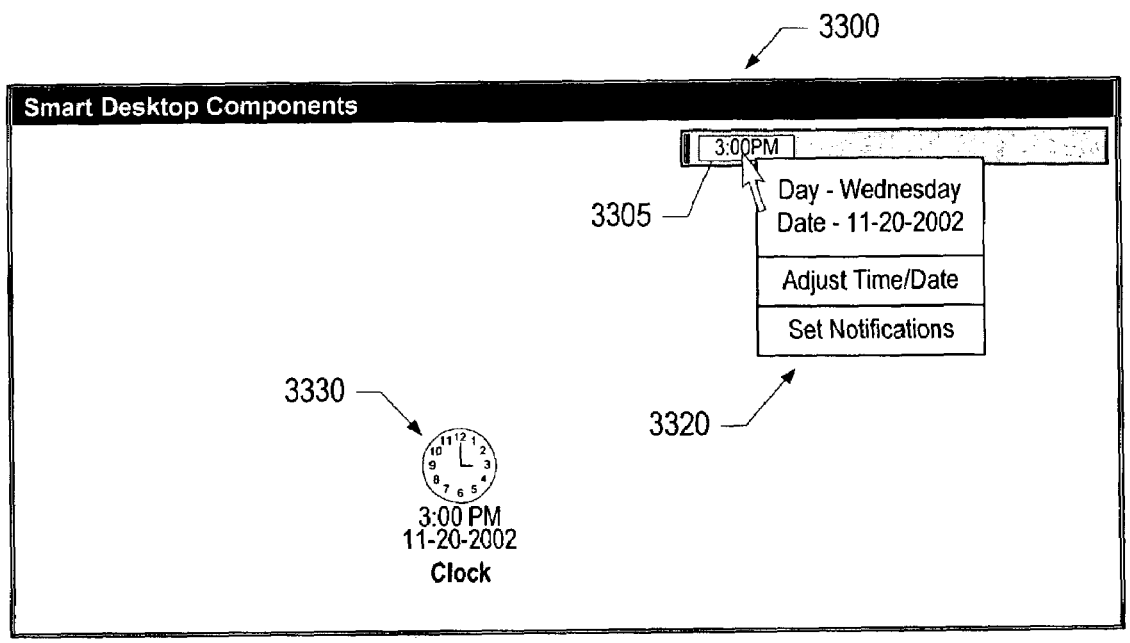
FIG. 33A is a screen layout showing an example of a smart graphical component.

FIG. 33A is a screen layout showing an example of a smart graphical component. The actual container type corresponds to an implementation construct such as a class in C++ and Java or a struct in C. This implementation construct will be referred to as the classtype. The smart component attempts to determine the classtype of it's parent component (e.g., a container) at runtime. If the identified classtype is of a type that the component recognizes, the component modifies its behavior and appearance according to the identified classtype. The behavior and appearance modifications can be programmatically incorporated into the smart component or read from a configuration file. If the classtype of the parent is not recognized, the component may be programmed to ascend it's parent hierarchy until a recognized container is found. In this manner, the component may be placed inside of a container with an unknown classtype, but if the parent container is itself inside of another container with a known classtype, then the component can configure itself as if it had been placed directly in the known container classtype.

The appearance and behavior of the smart component is determined by the classtype of it's parent container. For example, a smart icon will display a text description if it's parent classtype is a desktop. However, the same smart icon will not display the text description if it's parent classtype is a toolbar. Furthermore, the smart icons behavior may differ depending on the type of parent container. For example, if the icond is placed in a toolbar it may be programmed to draw a border around itself when the user places the mouse pointer over it. However, if the same icon is placed on the desktop it may be programmed to not display a border when the pointer passes over it. In addition, the smart icon may be programmed to execute different code related to the component upon activation depending upon the type of container to which it belongs.

Screen image 3300 includes two examples of a smart graphical component in the form of a time clock. Time clock 3305 is a component that has been placed in a toolbar container. Time clock 3330 is the same component, but this time the time clock has been placed in the desktop container. The appearance and behavior of the object changes depending upon the type of parent object, or container, to which the object belongs. In the example shown, time clock 3305 is displayed as a digital time because of the smaller area available in the parent toolbar container. Conversely, time clock 3330 displays an analog time because of the greater area available in the desktop container. In addition, time clock 3330 displays additional information such as the digital time and date underneath the analog clock image. Furthermore, time clock 3330 displays the name of the object (i.e. "clock") underneath the object.

When the user selects time clock 3305 located in the toolbar, pop-up window 3320 is displayed. Pop-up window 3320 displays the day of the week, date, and has menu items to adjust the time/date and to set notifications.

Figure 33B:
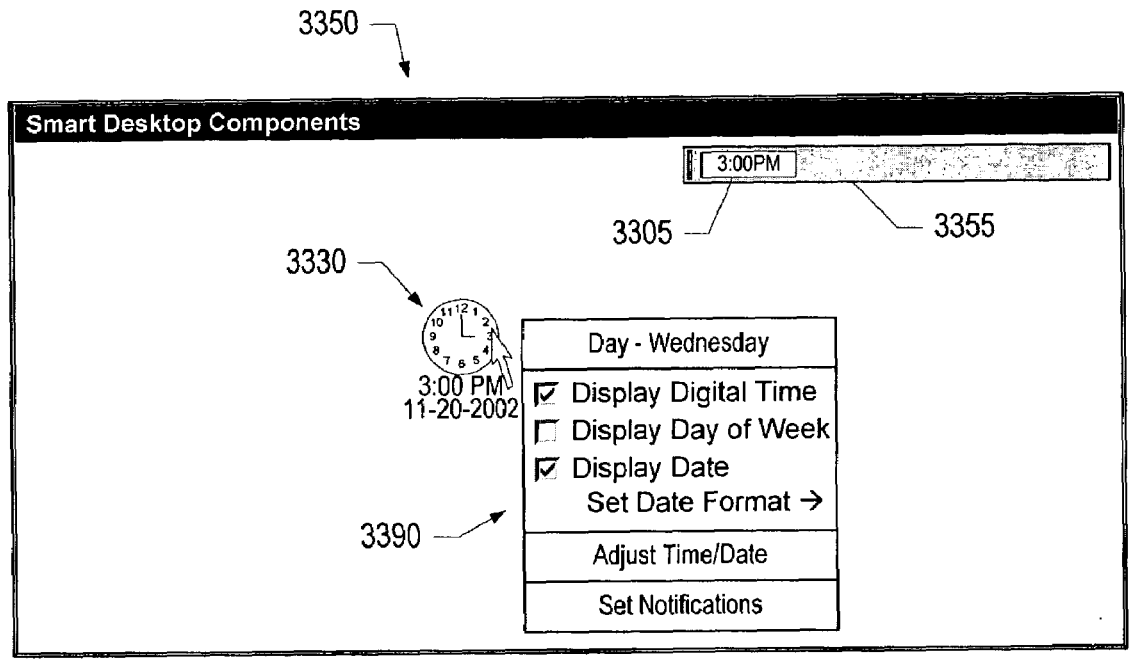
FIG. 33B is a screen layout showing an second example of a smart graphical component.

FIG. 33B is a screen layout showing an second example of a smart graphical component. Screen image 3350 is similar to a screen image shown in FIG. 33A, however in FIG. 33B time clock 3330 has been selected and pop-up menu 3390 is displayed. The behavior of displayed pop-up menu shown in FIG. 33B is different from that shown for the same time clock component shown in FIG. 33A. In particular, in FIG. 33B the user has display options as to whether a digital time clock, a day of the week, and display date should be shown along with the analog clock. These additional display options are available because of the larger size available for showing icons in the desktop container, rather than in a toolbar container.

Figure 34:
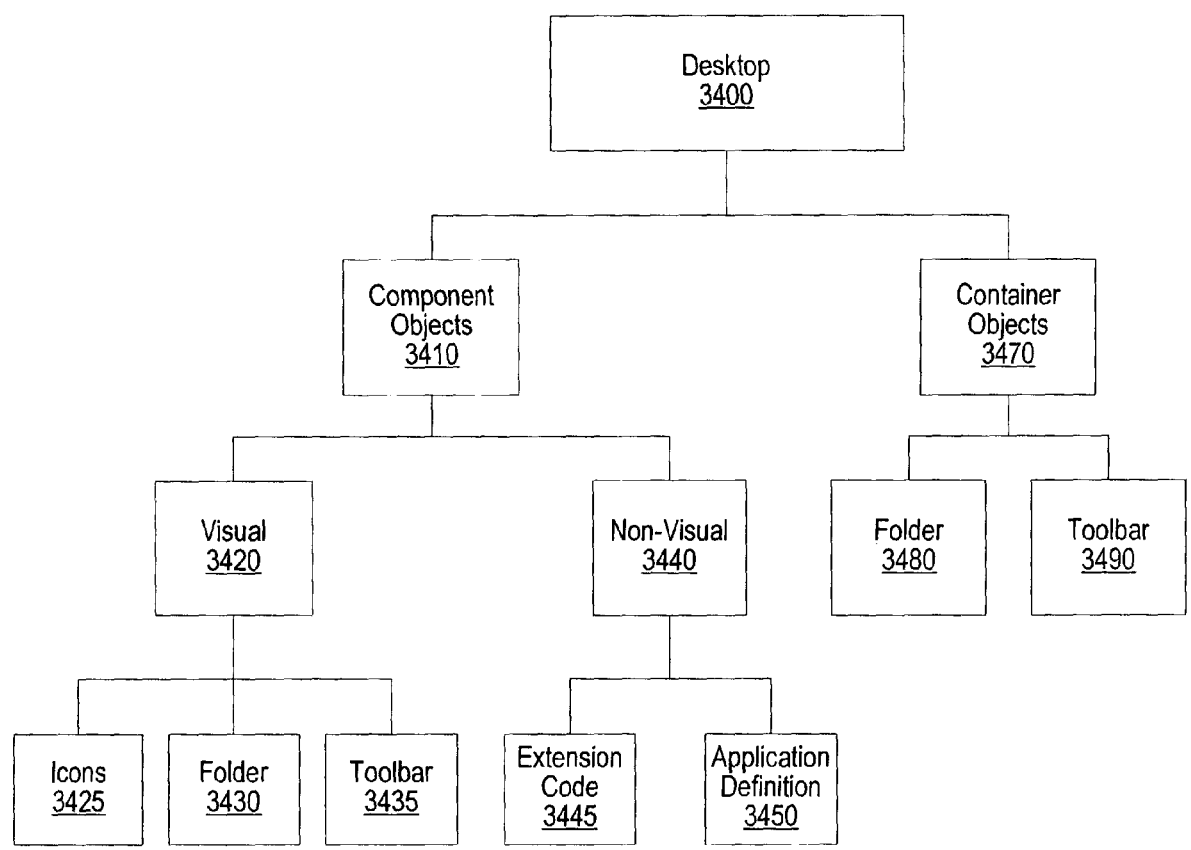
FIG. 34 is a hierarchy chart showing various desktop objects.

FIG. 34 is a hierarchy chart showing various desktop objects. Desktop object 3400 is at the top of the hierarchy chart and includes component objects 3410 and container objects 3470. Component objects 3410 include both visual components 3420 and non-visual components 3440. Visual component objects include icons 3425, folders 3430, and toolbars 3435. Non-visual component objects include application extension code 3445 and application definitions 3450.

As the name implies, container objects 3470 include objects that can include, or hold, other objects. Container objects include folders 3480 and toolbars 3490. Visual components such as icons can be included in container objects.

Figure 35:
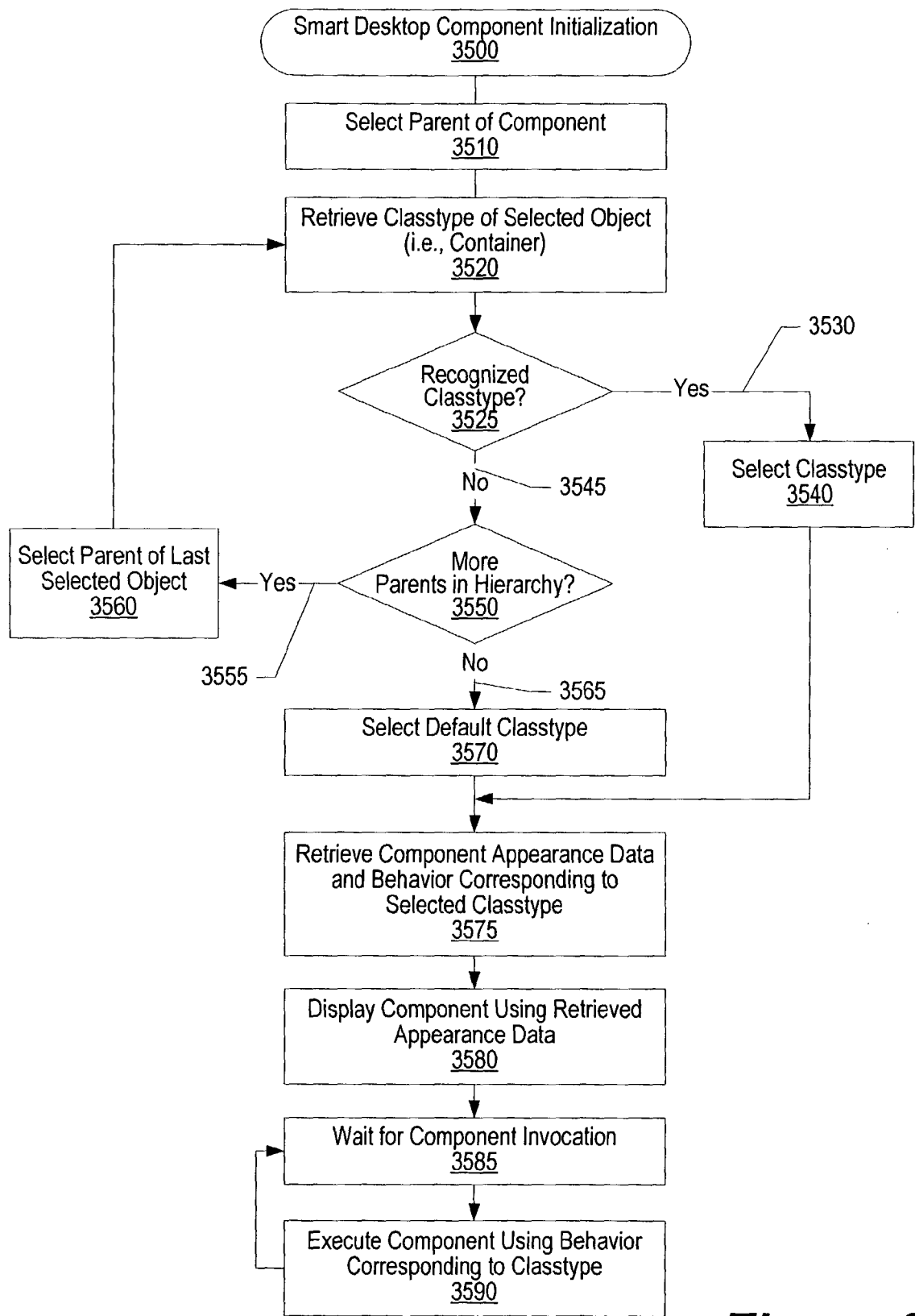
FIG. 35 is a flowchart showing steps taken in initializing smart graphical components.

FIG. 35 is a flowchart showing steps taken in initializing smart graphical components. Smart graphical component initialization processing commences at 3500 whereupon a object oriented parent object is selected for component (step 3510). The object oriented class type for the selected parent object is retrieved (step 3520). A determination is made as to whether the retrieved class type is a recognized class type, such as a folder or a toolbar (decision 3525). If the retrieved class type is not recognized, decision 3525 branches to "no" branch 3545 whereupon a determination is made as to whether there are more parents in the object hierarchy (decision 3550). If there are more parents in the object hierarchy, the parent of the last selected object (i.e. the parent of the last parent, or the grandparent of the subject object) is selected (step 3560) and processing loops back to determine whether the newly selected parent is a recognized class type. This looping continues until either a recognized class type is found or there are no more parents in the object hierarchy. If a recognized class type is found, decision 3525 branches to "yes" branch 3530 whereupon the recognized class type is selected (step 3540). On the other hand, if there are no more parents in the object hierarchy, decision 3550 branches to "no" branch 3565 whereupon a default class type is selected for the object (step 3570).

Component appearance data, such as the icon size and other display characteristics, are retrieved along with object behavior characteristics that correspond to the selected class type (step 3575). For example, if the retrieved class type is a toolbar then the icon size and display characteristics would be based upon the smaller area available to an icon that is displayed in a toolbar. However, if the retrieved class type is the desktop then the icon size and display characteristics are based upon the larger area available in the desktop.

The component is displayed using the retrieved appearance data that corresponds to the class type. The system waits for the component to be invoked (step 3585, i.e. until the component is selected by the user). When the component is invoked, the component is executed using behavior attributes that correspond to the class type (step 3590).

Figure 36:
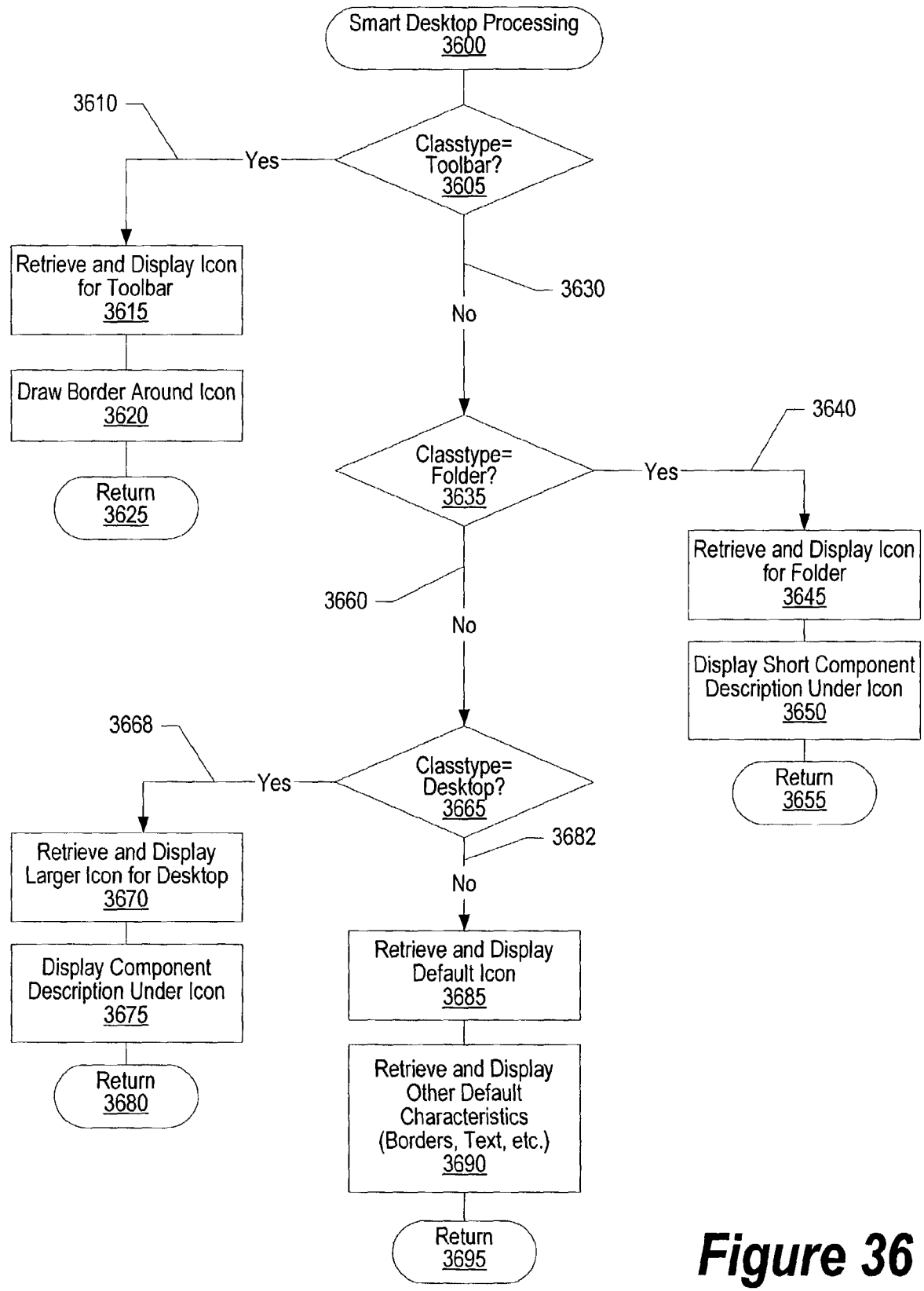
FIG. 36 is a flowchart showing steps taken in processing display attributes for smart graphical components.

FIG. 36 is a flowchart showing steps taken in processing display attributes for smart graphical components. Smart desktop processing commences at 3600 whereupon a determination is made as to whether the class type is a toolbar (decision 3605). If the class type is a 20 toolbar, decision 3605 branches to "yes" branch 3610 whereupon the toolbar icon for the component is retrieved and displayed in the toolbar (step 3615), a border is drawn around the icon in the toolbar (step 3620), and processing ends at 3625.

If the class type is not a toolbar, decision 3605 branches to "no" branch 3630 whereupon a determination is made as to whether the class type is a folder (decision 3635). If the class type is a folder, decision 3635 branches to "yes" branch 3640 whereupon the folder icon for 30 the component is retrieved and displayed in the folder (step 3645), a short component description is displayed underneath the icon (step 3650), and processing ends at 3655.

If the class type is not a toolbar or a folder, decision 3635 branches to "no" branch 3660 whereupon a determination is made as to whether the class type is the desktop (decision 3665). If the class type is the desktop, decision 3665 branches to "yes" branch 3668 whereupon the larger icon is retrieved in displayed on the desktop (step 3670), a longer component description is displayed under the icon (decision 3675), and processing ends at 3680.

If the class type is not a toolbar, a folder, or desktop, then decision 3665 branches to "no" branch 3682 whereupon a default icon is retrieved and displayed (step 3685), other default display characteristics are retrieved and applied to the icon (step 3690), and processing ends at 3695.

Figure 37:
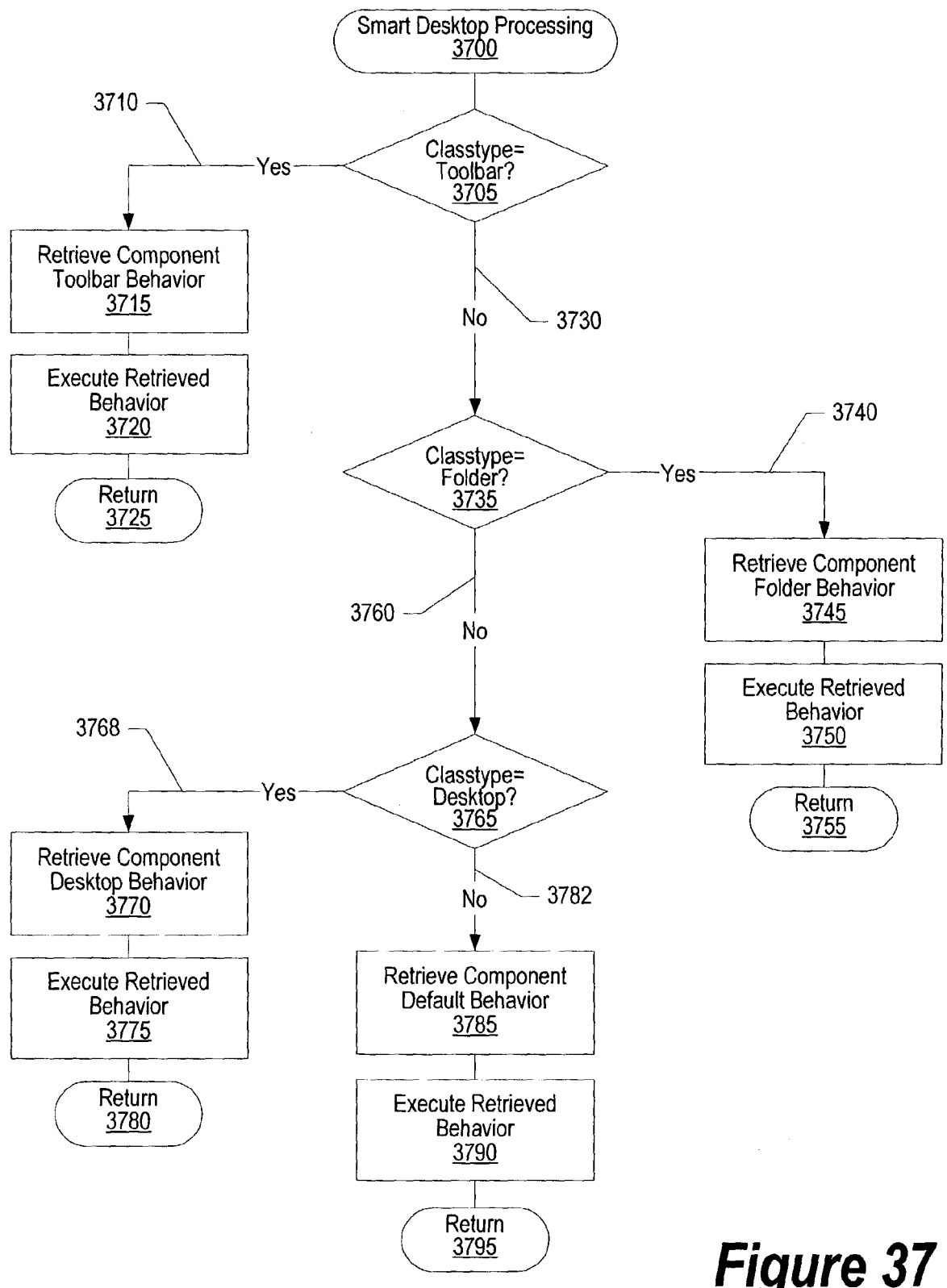
FIG. 37 is a flowchart showing steps taken in processing behavior attributes for smart graphical components.

FIG. 37 is a flowchart showing steps taken in processing behavior attributes for smart graphical components. Smart desktop processing commences at 3700 whereupon a determination is made as to whether the invoked component has a parent with a toolbar class type (decision 3705). If the invoked component has a toolbar parent class type, decision 3705 branches to "yes" branch 3710 whereupon the component's toolbar behavior is retrieved (step 3715), the retrieved toolbar behavior is executed (step 3720), and processing ends at 3725.

If the invoked component does not have a parent with a toolbar class type, decision 3705 branches to "no" branch 3730 whereupon a determination is made as to whether the invoked component has a parent with a folder class type (decision 3735). If the invoked component has a folder parent class type, decision 3735 branches to "yes" branch 3740 whereupon the component's folder behavior is retrieved (step 3745), executed (step 3750), and processing ends at 3755.

If the invoked component does not have any parent with a toolbar or folder class type, decision 3735 branches to "no" branch 3760 whereupon a determination is made as to whether the invoked component has a parent with a desktop class type (decision 3765). If the invoked component has a desktop parent class type, decision 3765 branches to "yes" branch 3768 whereupon the component's desktop behavior is retrieved (step 3770), executed (step 3775), and processing ends at step 3780.

If the invoked component does not have a parent with a class type of toolbar, folder, or desktop, decision 3765 branches to "no" branch 3782 whereupon the components default behavior is retrieved (step 3785), executed (step 3790), and processing ends at step 3795.

Figure 38:
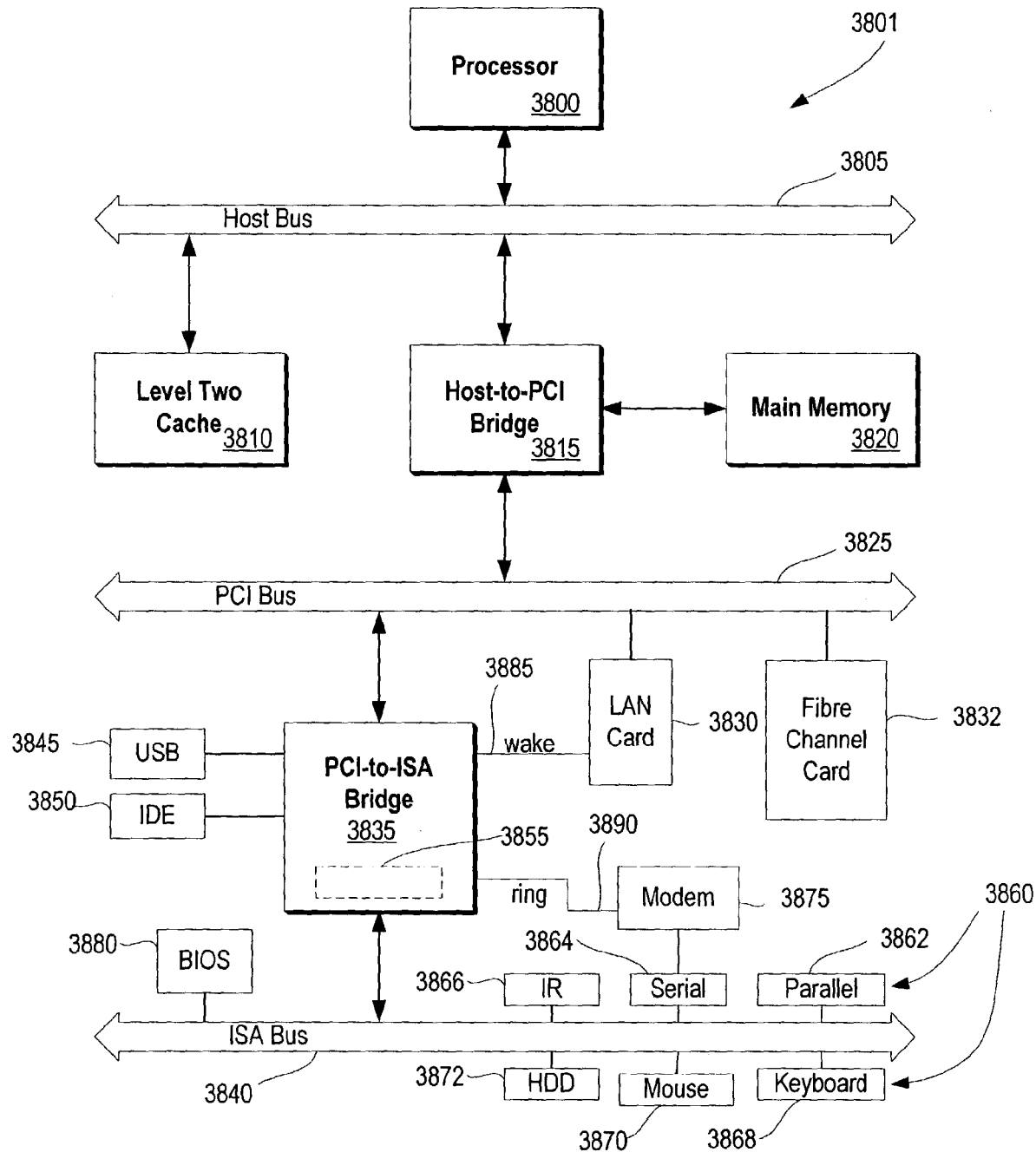
FIG. 38 is a block diagram of an information handling system capable of implementing the present invention.

FIG. 38 illustrates information handling system 3801 which is a simplified example of a computer system capable of performing the operations described herein. Computer system 3801 includes processor 3800 which is coupled to host bus 3805. A level two (L2) cache memory 3810 is also coupled to the host bus 3805. Host-to-PCI bridge 3815 is coupled to main memory 3820, includes cache memory and main memory control functions, and provides bus control to handle transfers among PCI bus 3825, processor 3800, L2 cache 3810, main memory 3820, and host bus 3805. PCI bus 3825 provides an interface for a variety of devices including, for example, LAN card 3830. PCI-to-ISA bridge 3835 provides bus control to handle transfers between PCI bus 3825 and ISA bus 3840, universal serial bus (USB) functionality 3845, IDE device functionality 3850, power management functionality 3855, and can include other functional elements not shown, such as a real-time clock (RTC), DMA control, interrupt support, and system management bus support. Peripheral devices and input/output (I/O) devices can be attached to various interfaces 3860 (e.g., parallel interface 3862, serial interface 3864, infrared (IR) interface 3866, keyboard interface 3868, mouse interface 3870, fixed disk (HDD) 3872 coupled to ISA bus 3840. Alternatively, many I/O devices can be accommodated by a super I/O controller (not shown) attached to ISA bus 3840.

BIOS 3880 is coupled to ISA bus 3840, and incorporates the necessary processor executable code for a variety of low-level system functions and system boot functions. BIOS 3880 can be stored in any computer readable medium, including magnetic storage media, optical storage media, flash memory, random access memory, read only memory, and communications media conveying signals encoding the instructions (e.g., signals from a network). In order to attach computer system 3801 to another computer system to copy files over a network, LAN card 3830 is coupled to PCI bus 3825 and to PCI-to-ISA bridge 3835. Similarly, to connect computer system 3801 to an ISP to connect to the Internet using a telephone line connection, modem 3875 is connected to serial port 3864 and PCI-to-ISA Bridge 3835.

While the computer system described in FIG. 38 is capable of executing the invention described herein, this computer system is simply one example of a computer system. Those skilled in the art will appreciate that many other computer system designs are capable of performing the invention described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method of locking a desktop shell that is executable on a plurality of operating system platforms, said method comprising:
   booting one of the operating system platforms on a computer system;
   loading a virtual machine middleware application on the booted operating system platform, wherein the virtual machine middleware application runs platform-neutral and native applications; and
   invoking a lockdown desktop shell application in the virtual machine middleware application, wherein invoking the lockdown desktop shell application includes preventing a user of the computer system from directly accessing the booted operating system platform by performing the following:
      maximizing a window corresponding to the lockdown desktop shell application;
      removing window resize and window exit controls from the window; and
      pinning the window to the foreground of a desktop window controlled by the booted operating system platform.

2. The method as described in claim 1 wherein the virtual machine middleware application is a Java virtual machine and wherein the lockdown desktop shell application is a Java application.

3. The method as described in claim 1 further comprising:
   displaying the window corresponding to the lockdown desktop shell application on a display device accessible from the computer system, wherein the displayed window is substantially the same in appearance when displayed on any of the plurality of operating system platforms.

4. The method as described in claim 1 further comprising:
   receiving a user identifier and a password from the user; and
   authenticating the user identifier and password before allowing the user to use the lockdown desktop shell application.

5. The method as described in claim 4 further comprising:
   receiving one or more self-contained desktops from a server in response to the authenticating, wherein each of the self-contained desktops include one or more desktop components; and
   displaying, on the lockdown desktop shell application, graphical images corresponding to one or more of the desktop components.

6. The method as described in claim 4 further comprising:
   receiving the lockdown desktop shell application from a server in response to the authenticating.

7. An information handling system comprising:
   one or more processors;
   a memory area accessible by the processors;
   a nonvolatile storage device accessible by the processors;
   a display device accessible by the processors;
   an operating system executed by the processors for managing the information handling system;
   a virtual machine middleware application running on the operating system;

a locking tool for displaying a lockdown desktop shell application, the locking tool including:
  means for booting the operating system;
  means for loading a virtual machine middleware application on the operating system, wherein the virtual machine middleware application runs platform-neutral applications; and
  means for invoking a lockdown desktop shell application in the virtual machine middleware application, wherein the lockdown desktop shell includes means for preventing a user of the computer system from directly accessing the operating system, wherein the means for preventing includes:
    means for maximizing a window corresponding to the lockdown desktop shell application;
    means for removing window resize and window exit controls from the window; and
    means for pinning the window to the foreground of a desktop window controlled by the booted operating system platform.

8. The information handling system as described in claim 7 wherein the virtual machine middleware application is a Java virtual machine and wherein the lockdown desktop shell application is a Java application.

9. The information handling system as described in claim 7 further comprising:
  means for displaying the window corresponding to the lockdown desktop shell application on a display device accessible from the computer system, wherein the displayed window is substantially the same in appearance when displayed on any of a plurality of operating system platforms.

10. The information handling system as described in claim 8 further comprising:
  means for receiving a user identifier and a password from the user; and
  means for authenticating the user identifier and password before allowing the user to use the lockdown desktop shell application.

11. The information handling system as described in claim 10 further comprising:
  means for receiving one or more self-contained desktops from a server in response to the authenticating, wherein each of the self-contained desktops include one or more desktop components; and
  means for displaying, on the lockdown desktop shell application, graphical images corresponding to one or more of the desktop components.

12. The information handling system as described in claim 10 further comprising:
  means for receiving the lockdown desktop shell application from a server in response to the authenticating.

13. A computer program product stored on a computer storage medium, the computer storage medium containing instructions for execution by a computer, which, when executed by the computer, cause the computer to execute a method for locking a desktop shell that is executable on a plurality of operating system platforms, said method comprising:
  booting one of the operating system platforms on a computer system;
  loading a virtual machine middleware application on the booted operating system platform, wherein the virtual machine middleware application runs platform-neutral applications; and
  invoking a lockdown desktop shell application in the virtual machine middleware application, wherein invoking the lockdown desktop shell application includes preventing a user of the computer system from directly accessing the booted operating system platform by performing the following:
    maximizing a window corresponding to the lockdown desktop shell application;
    removing window resize and window exit controls from the window; and
    pinning the window to the foreground of a desktop window controlled by the booted operating system platform.

14. The computer program product as described in claim 13 wherein the virtual machine middleware application is a Java virtual machine and wherein the lockdown desktop shell application is a Java application.

15. The computer program product as described in claim 13 wherein the method further comprises:
  displaying the window corresponding to the lockdown desktop shell application on a display device accessible from the computer system, wherein the displayed window is substantially the same in appearance when displayed on any of the plurality of operating system platforms.

16. The computer program product as described in claim 13 wherein the method further comprises:
  receiving a user identifier and a password from the user; and
  authenticating the user identifier and password before allowing the user to use the lockdown desktop shell application.

17. The computer program product as described in claim 16 wherein the method further comprises:
  receiving one or more self-contained desktops from a server in response to the authenticating, wherein each of the self-contained desktops include one or more desktop components; and
  displaying, on the lockdown desktop shell application, graphical images corresponding to one or more of the desktop components.

18. The computer program product as described in claim 16 wherein the method further comprises:
  receiving the lockdown desktop shell application from a server in response to the authenticating.

* * * * *